(12) United States Patent
Boyers

(10) Patent No.: US 6,674,054 B2
(45) Date of Patent: Jan. 6, 2004

(54) METHOD AND APPARATUS FOR HEATING A GAS-SOLVENT SOLUTION

(75) Inventor: David G. Boyers, Los Altos, CA (US)

(73) Assignee: Phifer-Smith Corporation, Palo Alto, CA (US)

( * ) Notice: Subject to any disclaimer, the term of this patent is extended or adjusted under 35 U.S.C. 154(b) by 17 days.

(21) Appl. No.: 10/133,275

(22) Filed: Apr. 26, 2002

(65) Prior Publication Data

US 2003/0102304 A1 Jun. 5, 2003

Related U.S. Application Data

(60) Provisional application No. 60/287,157, filed on Apr. 26, 2001.

(51) Int. Cl.$^7$ .............................. H05B 6/78; H05B 6/80; H05B 6/10; C03C 23/00
(52) U.S. Cl. ..................... 219/628; 219/629; 219/687; 392/314; 392/341; 134/19; 134/102.1
(58) Field of Search ................................ 219/628, 629, 219/630, 635, 687, 688; 392/314, 340, 341, 312; 134/19, 22.19, 30, 35, 102.1, 902

(56) References Cited

U.S. PATENT DOCUMENTS

| | | | | |
|---|---|---|---|---|
| 3,053,959 A | * | 9/1962 | Christmann | 219/629 |
| 4,341,592 A | * | 7/1982 | Shortes et al. | 156/643 |
| 4,417,116 A | * | 11/1983 | Black | 219/688 |
| 5,534,297 A | * | 7/1996 | Ogisu et al. | 427/322 |
| 5,599,502 A | * | 2/1997 | Miyazaki et al. | 422/82.01 |
| 5,803,131 A | * | 9/1998 | Iwasa et al. | 138/137 |
| 5,863,333 A | * | 1/1999 | Kato et al. | 118/315 |

FOREIGN PATENT DOCUMENTS

JP 2000-2698 * 1/2000

* cited by examiner

Primary Examiner—Philip H. Leung
(74) Attorney, Agent, or Firm—Joseph Smith

(57) ABSTRACT

This invention provides a method of quickly heating a gas-solvent solution from a relatively low temperature T1 to a relatively high temperature T2, such that the gas-solvent solution has a much higher dissolved gas concentration at temperature T2 than could be achieved if the gas-solvent solution had originally been formed at the temperature T2. Various apparatuses are also provided for carrying out the heating method.

32 Claims, 10 Drawing Sheets

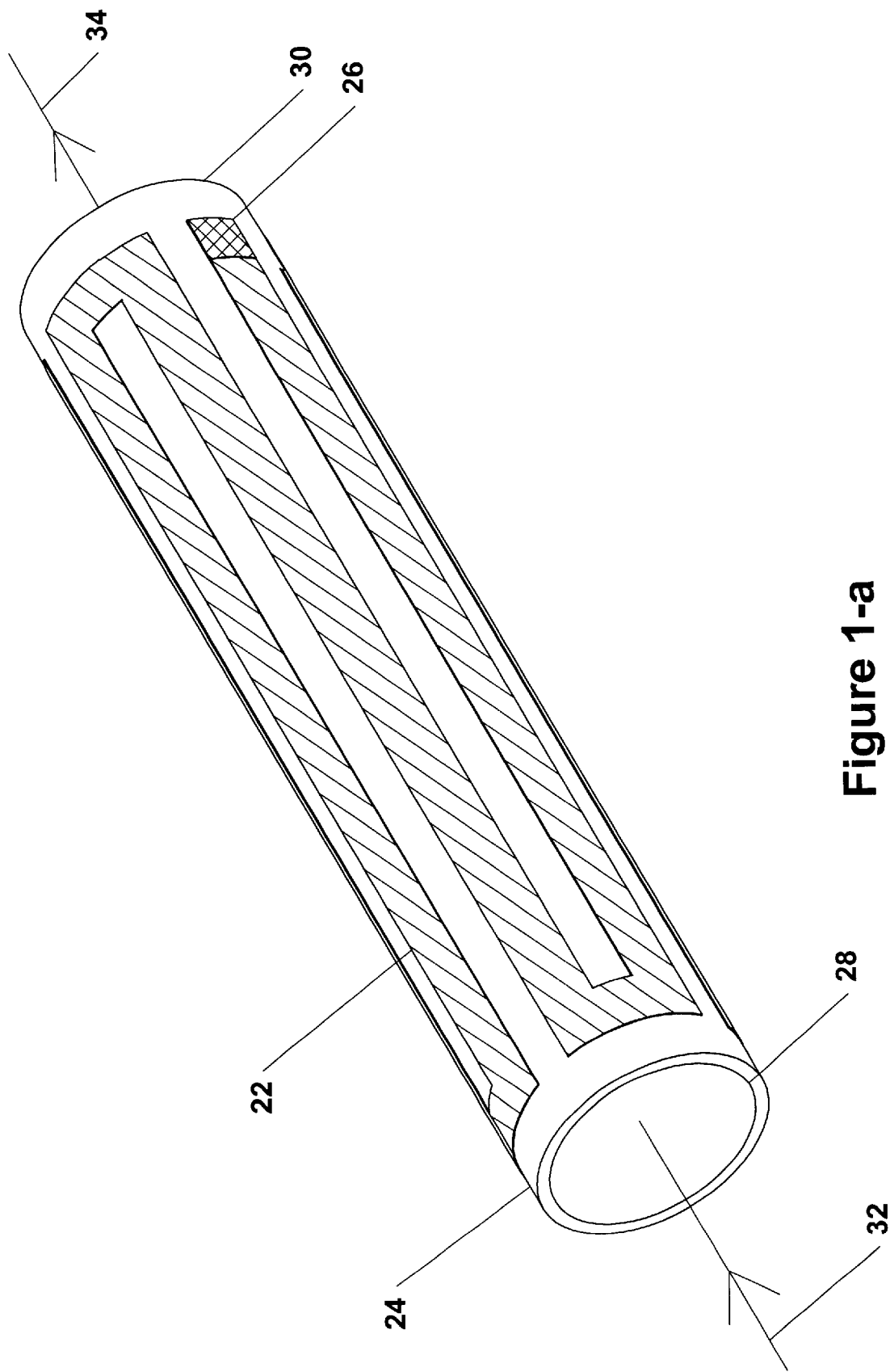
Figure 1-a

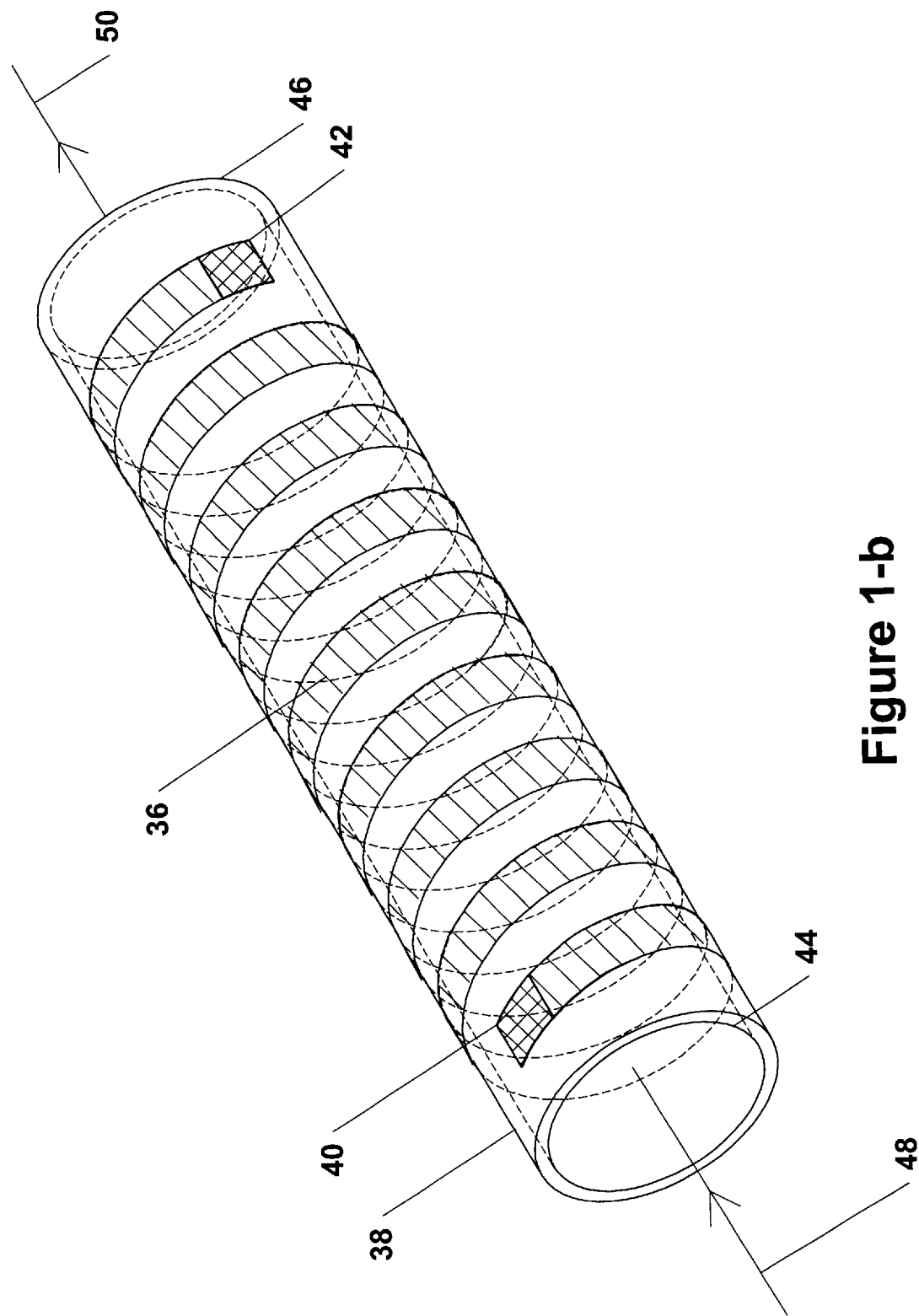
Figure 1-b

METHOD AND APPARATUS FOR HEATING A GAS-SOLVENT SOLUTION

This invention claims priority from provisional patent application No. 60/287,157, filed in the United States Patent and Trademark Office on Apr. 26, 2001, entitled METHOD AND APPARATUS FOR HEATING, by inventor David G. Boyers.

Prior patent application Ser. No. 09/693,012, filed Oct. 19, 2000, "A Method and Apparatus for Treating a Substrate with an Ozone-Solvent Solution", by inventors Boyers and Cremer is hereby incorporated by reference. That patent application is based upon provisional patent application No. 60/160,435, filed Oct. 19, 1999, "A Method of Oxidizing Materials at High Speed Using a Solution of Ozone Gas Dissolved in Water," by inventors Boyers and Cremer.

BACKGROUND AND-CROSS-REFERENCE TO RELATED APPLICATIONS

This invention concerns a method and apparatus for quickly heating a gas-solvent solution, and particularly an ozone-solvent solution. The method may be used for removing photoresist, post ash photoresist residue, post-etch residue, and other organic materials from semiconductor wafers, flat panel display substrates, and the like at high speed using a solution of gas dissolved in a solvent, such as ozone dissolved in water.

Reference

U.S. Pat. No. 6,037,574, by Lanham, C. C.; Ptasienski, K.; Steinhauser, L. P.; Lake, R. H.; Kreisel, J. H., entitled QUARTZ SUBSTRATE HEATER, filed Nov. 6, 1997, issued Mar. 14, 2000.

SUMMARY OF INVENTION

This invention provides a method of quickly heating an ozone-solvent solution from a relatively low temperature T1 to a relatively high temperature T2, such that the ozone-solvent solution has a much higher dissolved ozone concentration at temperature T2 than could be achieved if the ozone-solvent solution had originally been formed at the temperature T2. The method includes the steps of:

a) introducing the ozone-solvent solution at a temperature T1 into a heating volume;

b) transferring sufficient power into the heating volume while the ozone-solvent solution is flowing through the heating volume to create a heated flowing ozone-solvent solution having a temperature T2 at the outlet orifice of the heating volume, and c) receiving the heated flowing ozone-solvent solution at the outlet orifice of the heating volume.

Various apparatuses are also provided for carrying out the heating method. In the preferred mode, the fluid is heated at high speed by using a heated volume that is relatively small, in order to minimize the residence time of the fluid inside the heated volume at a given flow rate to minimize the time required to increase the temperature of the fluid from T1 to T2.

Features and Advantages can be implemented in a high-purity metal free design: provides a method and apparatus for quickly heating a flowing ozone-solvent solution which avoids the introduction of metals or other contaminants into the ozone-solvent solution.

extremely small residence volume: provides a method and apparatus for quickly heating a flowing ozone-solvent solution with a very small residence volume so as to minimize the time required for the solution to move from its initial unheated state at the heater inlet to its heated state at the heater outlet.

can be manufactured using existing materials and technology: provides an apparatus for quickly heating a flowing ozone-solvent solution which can readily manufactured using existing materials and technology.

high reliability: provides an apparatus for heating which can meet the reliability requirements for equipment used in a manufacturing operation.

BRIEF DESCRIPTION OF DRAWINGS

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

1st GROUP: Direct Conduction Heater Designs (FIG. 1 (1a and 1b) and FIG. 2)

Figure 3:
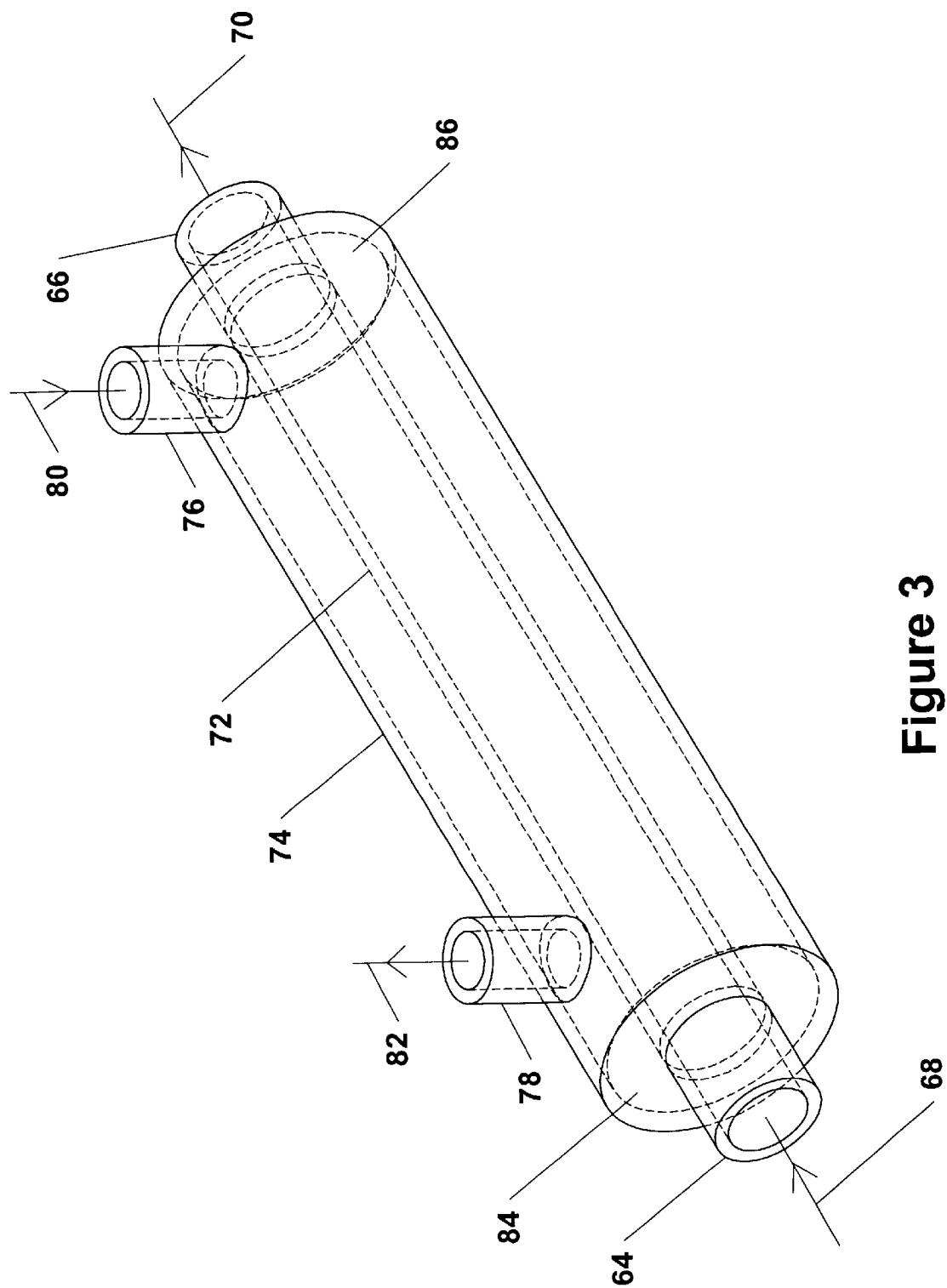
Figure 4:
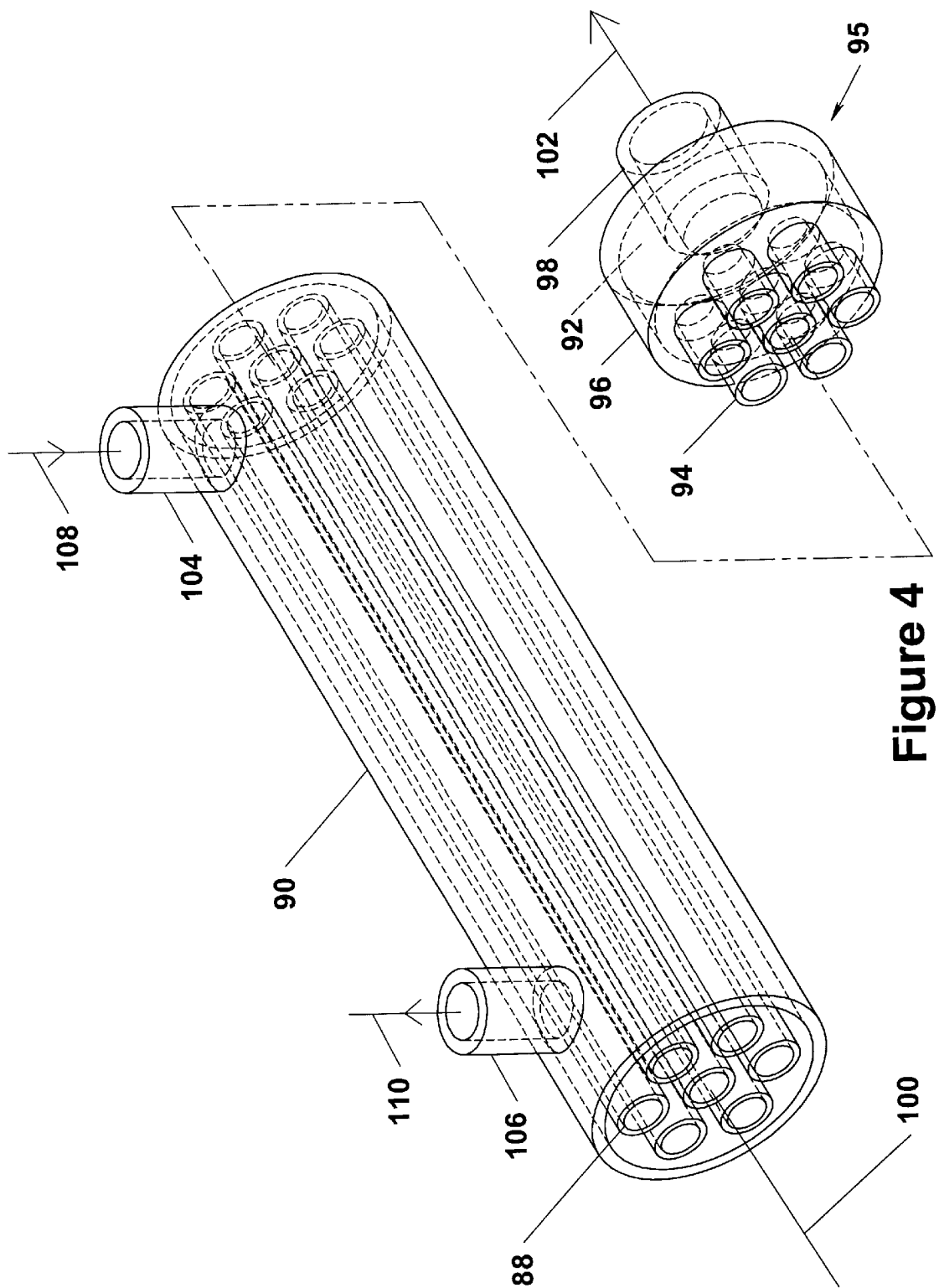

$2^{nd}$ GROUP: Heat Exchanger Designs (FIG. 3 and FIG. 4)

Figure 5:
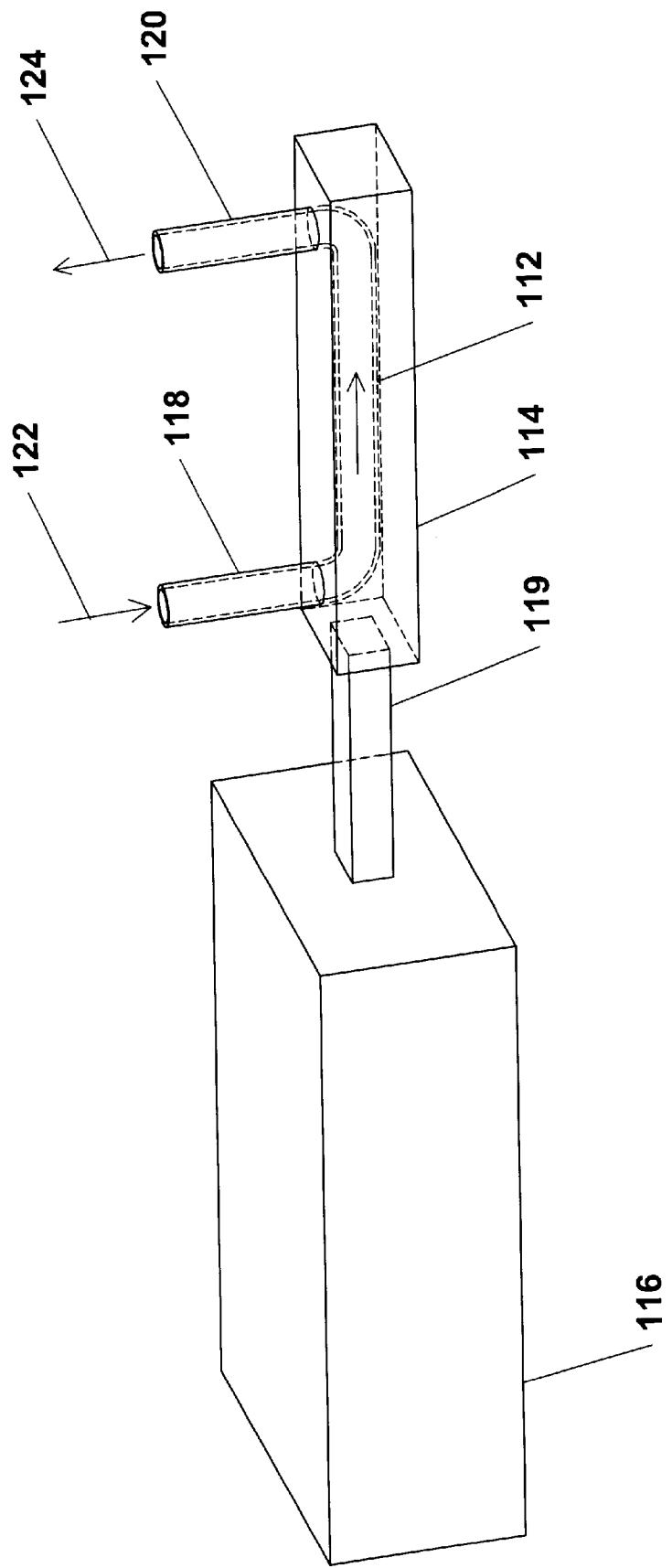

$3^{rd}$ GROUP: Direct Microwave Heater Designs (FIG. 5)

Figure 6:
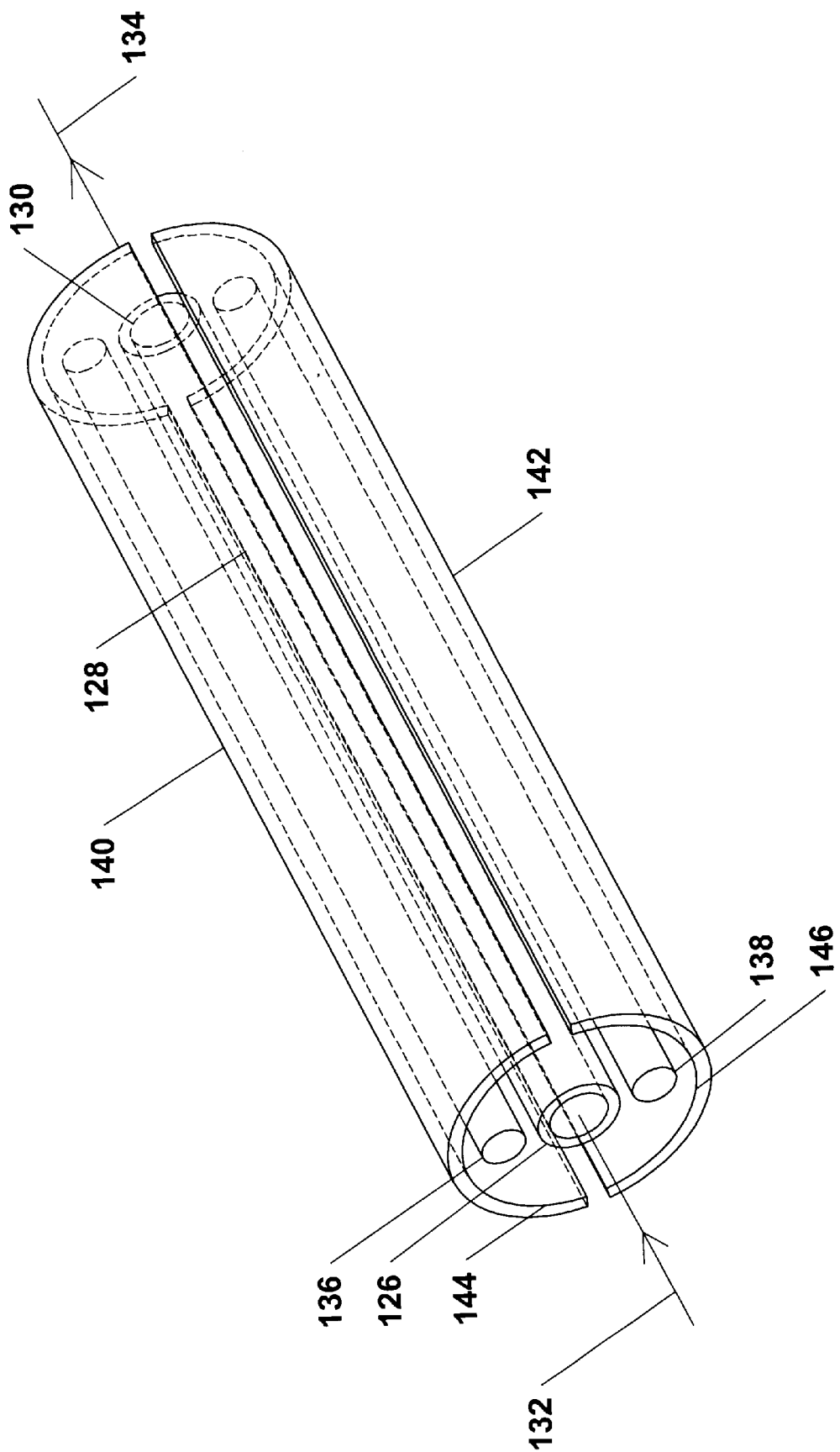

$4^{th}$ GROUP: Direct Infrared Heater Designs (FIG. 6)

Figure 7:
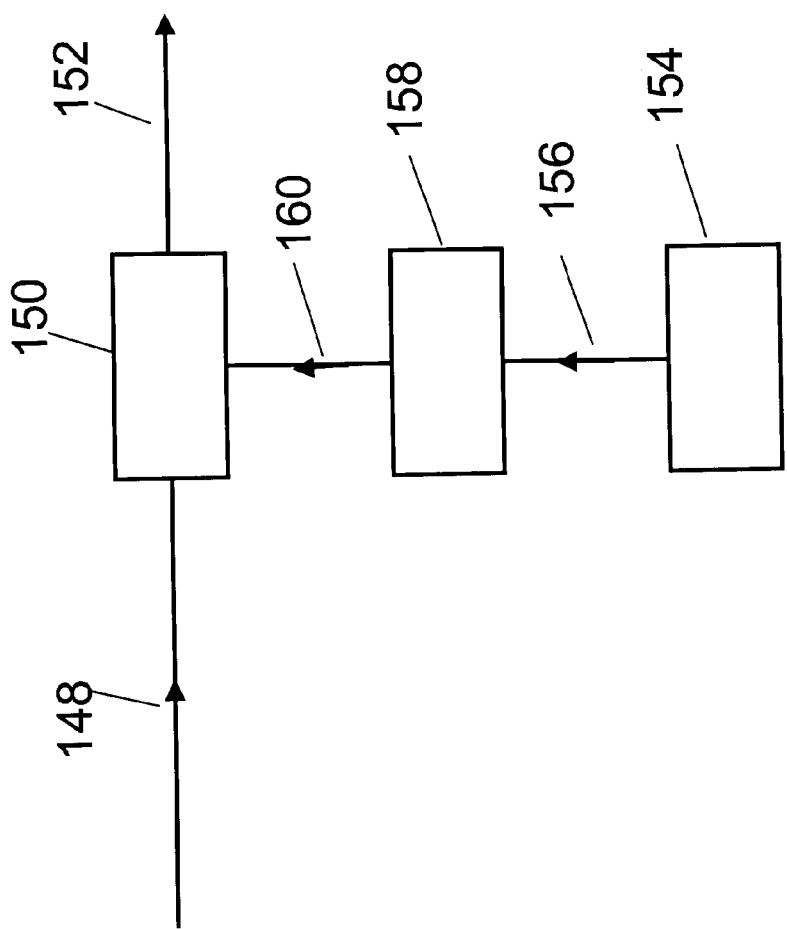

5th GROUP: Heated Fluid Injection Designs (FIG. 7)

Figure 8:
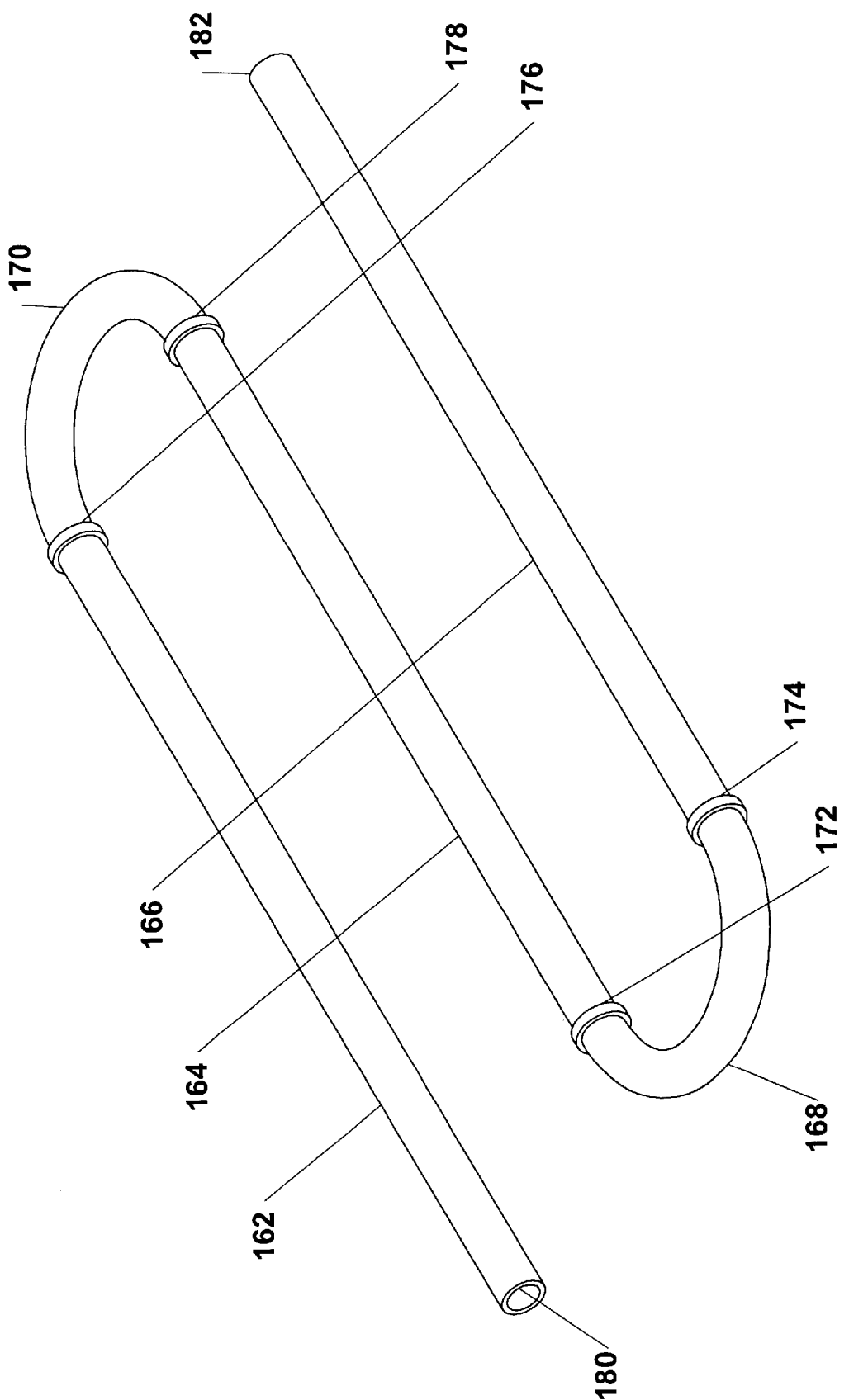
Figure 9:
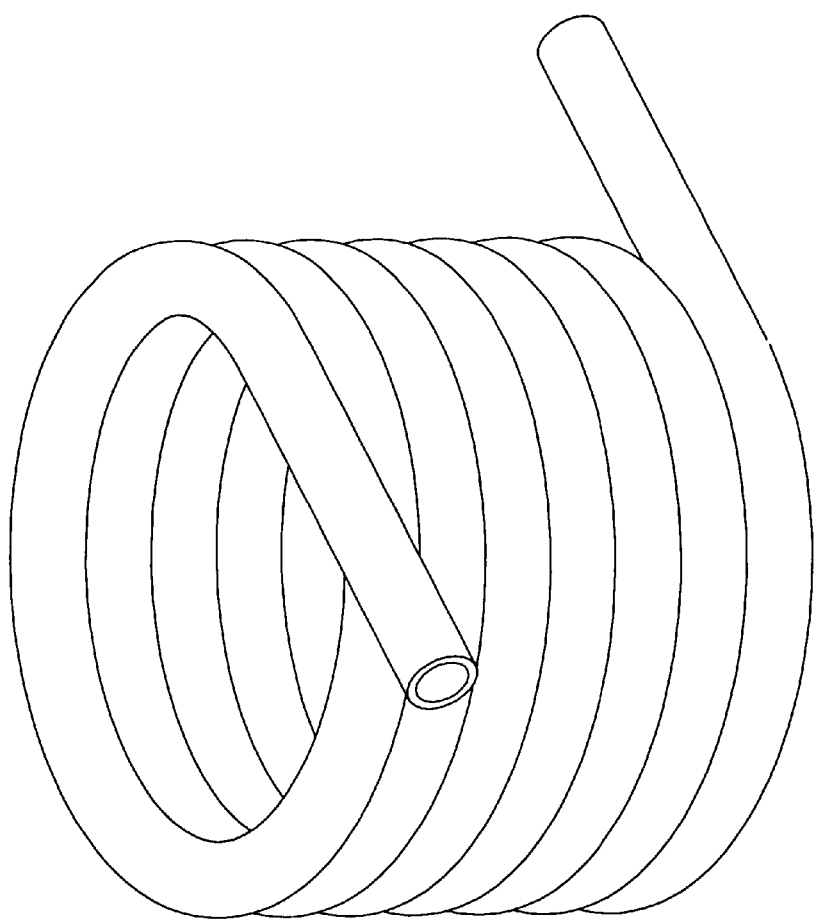

$6^{th}$ GROUP: Long Heater Design Geometry (FIG. 8 and FIG. 9)

Direct Conduction Heater Designs

FIGS. 1a and 1b. illustrates a single tube resistance heated design employing a tube with resistive heating elements in thermal contact with the outer surface of the tube. The fluid to be heated (process fluid) flows through the tube.

Figure 2:
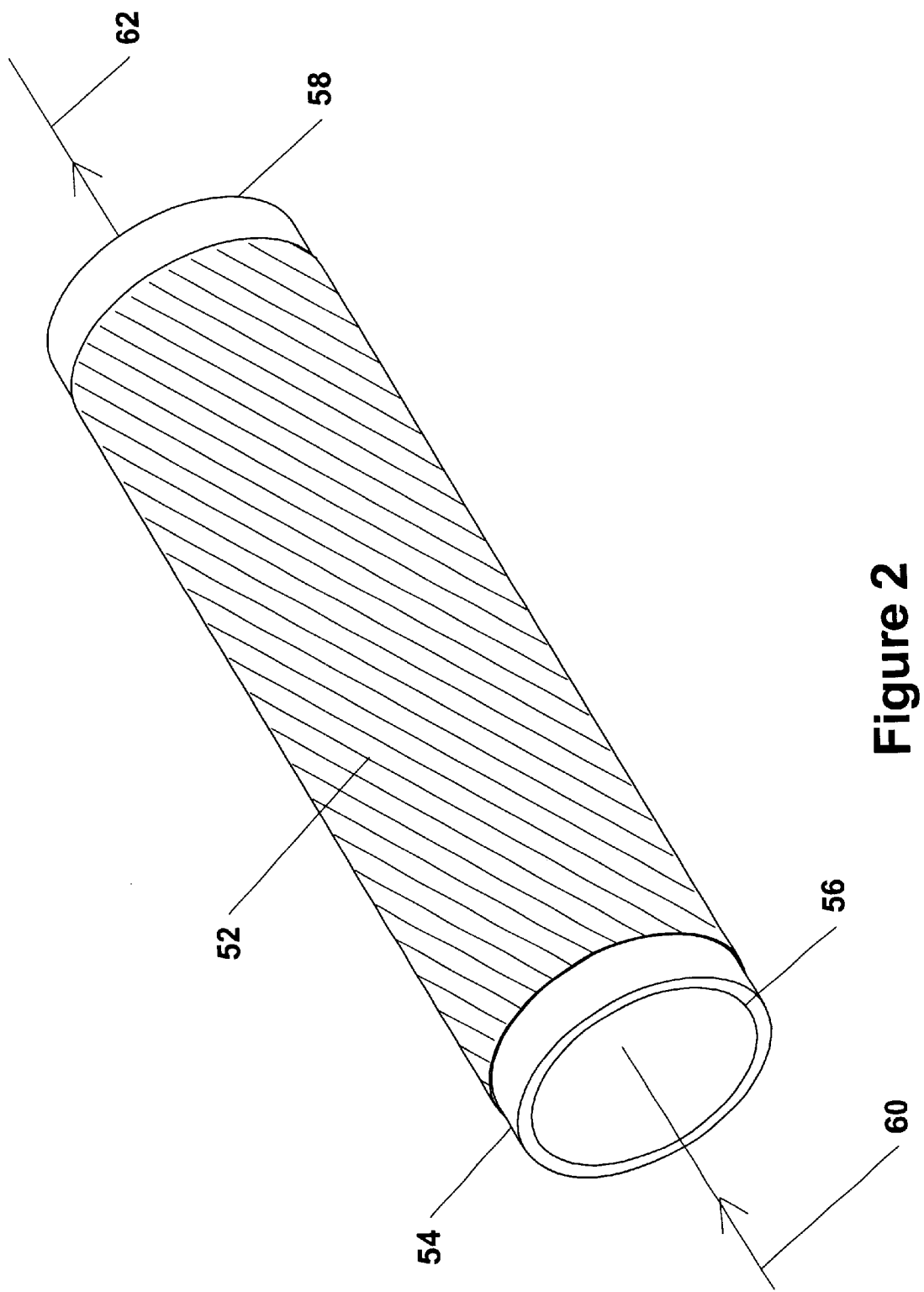

FIG. 2. illustrates a single tube induction heated design employing a tube with inductively heated elements in thermal contact with the outer surface of the tube. The fluid to be heated (process fluid) flows through the tube.

Heat Exchanger Designs

FIG. 3. illustrates a single tube-in-tube heat exchanger with a heated fluid (working fluid) flowing in the volume between the outer tube and the inner tube and the fluid to be heated (process fluid) flowing through the inner tube.

FIG. 4. illustrates a multiple tube-in-tube heat exchanger with a heated fluid (working fluid) flowing in the volume between the outer tube and the multiplicity of inner tubes and the fluid to be heated (process fluid) flowing through the inner tubes.

Direct Microwave Heater Design

FIG. 5. illustrates a single tube microwave heated design employing a liquid carrying conduit inside a microwave resonator connected to microwave power source to heat the liquid flowing in the liquid carrying conduit. The fluid to be heated (process fluid) flows through the tube.

Direct Infrared Heater Design

FIG. 6. illustrates a single tube infrared heated design employing a liquid carrying conduit with minimal infrared absorption and an adjacent infrared radiation source to heat the liquid flowing in the liquid carrying conduit. The fluid to be heated (process fluid) flows through the tube.

Heated Fluid Injection Design

FIG. 7. illustrates a fluid injection type heater with a heated fluid (heated water or steam for example) injected into the inlet port of an injector and the fluid to be heated (cold process fluid) flowing into the motive flow inlet of the injector and the heated process fluid flowing from the outlet port of the injector.

Long Heater Design Geometry

FIG. 8 illustrates a general approach to joining individual straight sections of heater with fittings into a folded compact heater design.

FIG. 9 illustrates a general approach to bending a long heater into a coil for a compact heater design.

DETAILED DESCRIPTION OF THE PREFERRED EMBODIMENTS

TABLE 1

Example Direct Conduction Heater Designs

Heating Method

| Heat Source | Wetted | Geometry | Figure |
|---|---|---|---|
| | Direct Conduction Heater | | |
| Resistance ®, Induction (I), or Microwave (MW) | Teflon (T), or Quartz (Q) | Single Tube (ST), Single Tube-in-Tube (STT), Multiple Tube-in-Tube (MTT) | |
| R | Q | ST | 1 |
| R | Q | STT | |
| R | Q | MTT | |
| R | T | ST | 1 |
| R | T | STT | |
| R | T | MTT | |
| I | Q | ST | 2 |
| I | Q | STT | |
| I | Q | MTT | |
| I | T | ST | 2 |
| I | T | STT | |
| I | T | MTT | |

TABLE 2

Example Heat Exchanger Designs

Heating Method

| Heat Source | Wetted Material | Geometry | Figure |
|---|---|---|---|
| | Heat Exchanger | | |
| Heated Liquid (HL), Steam (S), or Heated Gas (HG) | Stainless Steel (SS), Teflon (T), or Quartz (Q) | Single Tube-in-Tube (STT), Multiple Tube-in-Tube (MTT) | |
| HL | SS | STT | 3 |
| HL | SS | MTT | 4 |
| HL | T | STT | 3 |
| HL | T | MTT | 4 |
| HL | Q | STT | 3 |
| HL | Q | MTT | 4 |
| S | SS | STT | 3 |
| S | SS | MTT | 4 |
| S | Q | STT | 3 |
| S | Q | MTT | 4 |
| HG | SS | STT | 3 |
| HG | SS | MTT | 4 |
| HG | Q | STT | 3 |
| HG | Q | MTT | 4 |

TABLE 3

Example Microwave Heater Designs

Heating Method

| Heat Source | Wetted Material | Geomery | Figure |
|---|---|---|---|
| | Direct Microwave Heater | | |
| Microwave (MW) | Teflon (T), or Quartz (Q) | Single Tube (ST), | |
| MW Radiation | Q | ST | 5 |
| MW Radiation | T | ST | 5 |

TABLE 4

Example Infrared Heater Designs

Heating Method

| Heat Source | Wetted Material | Geometry | Figure |
|---|---|---|---|
| | Direct Infrared Heater | | |
| Infrared | Quartz (Q) | Single Tube (ST), | |
| Infrared Radiation | Q | ST | 6 |

TABLE 5

Example Heated Fluid Injection Designs

Heating Method

| Heat Source | Wetted Material | Geometry | Figure |
|---|---|---|---|
| | Heated Fluid Injection | | |
| Heated Liquid (HL) or Steam (S) | Stainless Steel (SS), Teflon (T), or Quartz (Q) | Single Tube w/ Injector (STI) | |
| S | SS | STI | 7 |
| S | T | STI | 7 |
| S | Q | STI | 7 |
| HL | SS | STI | 7 |
| HL | T | STI | 7 |
| HL | Q | STI | 7 |

Heater Design—Technical Approach

Given the temperature and flow rate of the liquid entering the heater and the desired outlet temperature, we can compute the energy that must be transferred to the liquid by the heater. In the case in which the liquid to be heated is water, we can make such a calculation. The results are shown in Table 6 below.

TABLE 6

Point-of-use Heater Power Requirement

| Dispense Flow Rate (L/min) | Inlet Water Temp. (deg. C.) | Desired Outlet Water Temp. (deg. C.) | Required Temp. Increase (deg. C.) | Power Req'd (kW) |
|---|---|---|---|---|
| 2.7 | 5 | 45 | 40 | 7.45 |
| 2.7 | 5 | 55 | 50 | 9.3 |
| 2.7 | 5 | 65 | 60 | 11.2 |
| 2.7 | 5 | 75 | 70 | 13.0 |
| 2.7 | 5 | 85 | 80 | 14.9 |

TABLE 6-continued

Point-of-use Heater Power Requirement

| Dispense Flow Rate (L/min) | Inlet Water Temp. (deg. C.) | Desired Outlet Water Temp. (deg. C.) | Required Temp. Increase (deg. C.) | Power Req'd (kW) |
| --- | --- | --- | --- | --- |
| 2.7 | 5 | 95 | 90 | 16.8 |
| 3.3 | 5 | 45 | 40 | 9.1 |
| 3.3 | 5 | 55 | 50 | 11.4 |
| 3.3 | 5 | 65 | 60 | 13.7 |
| 3.3 | 5 | 75 | 70 | 15.9 |
| 3.3 | 5 | 85 | 80 | 18.2 |
| 3.3 | 5 | 95 | 90 | 20.5 |

We can heat the flowing liquid by transferring heat from a resistance heating element or induction heated element in thermal contact with the outer surface of a tube carrying the liquid. The energy that can be transferred is directly proportional to the average temperature difference between the flowing liquid and the heated element and the thermal resistance between the flowing liquid and the heating elements. The thermal resistance is the sum of the thermal resistance between the flowing liquid and the inner surface of the tube carrying the liquid and the thermal resistance from the inner surface of the tube to the heating element on the outer surface of the tube. The first resistance is lower at higher flow rates where the Reynolds number is higher and the boundary layer thickness is smaller and the second resistance is lower for tubes with thin walls made from materials with high thermal conductivity. The thermal resistance is also made smaller if the area through which the energy is transferred is larger. When the surface area is made larger by increasing the length of the tube, then the pressure drop from the tube inlet to tube outlet (fluid flow resistance) increases. If the surface area is made larger by increasing the diameter of the tube, then the pressure fluid velocity and pressure drop for a given flow rate is lower. However, the lower flow velocity produces a lower Reynolds number and high thermal resistance (film resistance) between the flowing liquid and the inner surface of the tube. If the liquid is carried by a multiplicity of small diameter tubes, then the surface area will be larger than a design in which the same flow is carried by a single tube of the same cross sectional area.

Whereas the use of tube materials of high thermal conductivity will reduce the temperature difference required to transfer a given amount of energy for a given surface area, the choice of materials can be limited by the materials compatible with the particular application. Whereas metals such as 316 stainless steel can be used in some applications, other applications may not use metals. In many high purity applications such as semiconductor manufacturing, the wetted materials are materials such as quartz, Teflon PFA, Teflon PTFE. These materials have a lower thermal conductivity than metals (See Table 7 below). Accordingly, if a resistance heated or induction heated heater or fluid to fluid heat exchanger is to transfer a given amount of energy at a given temperature difference using these lower thermal conductivity materials, then the material area can be made relatively large for a given material thickness.

TABLE 7

Thermal Conductivity Data

| Material | Thermal Conductivity (watt/meter deg. K) |
| --- | --- |
| 316 Stainless Steel | 16.3 |
| Titanium | 16.3 |
| Quartz | 1.4 |
| Teflon PTFE | 0.245 |

We have made some sample calculations of the required temperature difference to transfer 9,000 watts for the several heater designs for a process fluid inlet temperature of 20 degree C. and flow rate of 2.65 L/min. These are shown in the spread sheet below. We can see that a design using a 10 foot length of 0.250 inch OD, 0.180 inch ID 316 stainless steel tubing heated on the exterior can transfer 9 Kwatt to water flowing through the tubing at a flow rate of 2.65 L/min by maintaining a maximum and minimum element temperature on the exterior wall of the tube of only about 46 and 95 degree C., respectively as shown under design example 1. When the tube wall is made from quartz, a heater of the same dimensions can transfer the same power to the flowing water if the maximum and minimum element temperature on the exterior wall of the tube is increased to 46 and 95 degree C., respectively as shown under design example 2. If the heater length is increased to 15 or 20 feet, then the exterior temperatures can be reduced further while limiting the internal volume to no more than 100 ml as shown in design example 3 and 4. This is contrasted with a conventional design resistance heated quartz tube heater. Such a heater has very low reynolds numbers and therefore very high thermal resistance between the flowing water and the inner surface of the tube and very thick wall and therefore a very high thermal resistance from the inside wall to the outside wall. Accordingly, a 1.75 inch OD, 1.5625 ID, 27 inch long heater will transfer the 9 Kw to the flowing stream if the maximum and minimum element temperature on the exterior wall of the tube is increased to 584 and 619 degree C., respectively, as shown under the conventional design example. These element temperatures are much higher than required for the designs in examples 2, 3,and 4. (See Table 8)

Direct Conduction Heater Design Calculations

TABLE 8

Heater design performance calculations - applicable to tube heaters with resistance heated or induction heated elements bonded to the surface

| low volume, high performance heater design | Inventive Design A | Inventive Design B | Inventive Design C | Inventive Design D | Prior Art Design |
| --- | --- | --- | --- | --- | --- |
| tubing ID (inches) | 0.18 | 0.18 | 0.18 | 0.18 | 1.5625 |
| tubing OD (inches) | 0.25 | 0.25 | 0.25 | 0.25 | 1.75 |
| tubing wall thickness (inches) | 0.035 | 0.035 | 0.035 | 0.035 | 0.09375 |
| tubing ID (cm) | 0.457 | 0.457 | 0.457 | 0.457 | 3.969 |
| tubing OD (cm) | 0.635 | 0.635 | 0.635 | 0.635 | 4.445 |
| tubing wall thickness (cm) | 0.089 | 0.089 | 0.089 | 0.089 | 0.238 |

TABLE 8-continued

Heater design performance calculations - applicable to tube heaters with resistance heated or induction heated elements bonded to the surface

| low volume, high performance heater design | Inventive Design A | Inventive Design B | Inventive Design C | Inventive Design D | Prior Art Design |
|---|---|---|---|---|---|
| length of heated tube (in) | 120.00 | 120.00 | 180.00 | 240.00 | 27.00 |
| length of heated tube (cm) | 304.8 | 304.8 | 457.2 | 609.6 | 68.6 |
| volume of heated tube (cm3) = ml | 50.0 | 50.0 | 75.1 | 100.1 | 848.4 |
| liquid fluid material being heated | water | water | water | water | water |
| fluid inlet temperature (deg. C.) | 20 | 20 | 20 | 20 | 20 |
| fluid density rho (g/cm3) | 0.9974 | 0.9974 | 0.9974 | 0.9974 | 0.9974 |
| fluid kinematic viscosity eta (g/cm-sec) | 9.80E-03 | 9.80E-03 | 9.80E-03 | 9.80E-03 | 9.80E-03 |
| flow rate (gal/min) | 0.7 | 0.7 | 0.7 | 0.7 | 0.7 |
| flow rate (liters/min) | 2.65 | 2.65 | 2.65 | 2.65 | 2.65 |
| flow rate (ml/sec) | 44.16 | 44.16 | 44.16 | 44.16 | 44.16 |
| tubing flow cross section area (cm2) | 0.1642 | 0.1642 | 0.1642 | 0.1642 | 12.3708 |
| free stream velocity through tubing (cm/sec) | 269.00 | 269.00 | 269.00 | 269.00 | 3.57 |
| Re = density * free stream vel. * hydraulic.diam/kinem. viscosity | 12517 | 12517 | 12517 | 12517 | 1442 |
| nozzle ID friction factor (turbulent flow - FIG. 6.4) | 0.0295 | 0.0295 | 0.0295 | 0.0295 | 0.0592 |
| pressure drop across tubing (newtons/m2) Pascal | 71087.29 | 71087.29 | 106630.93 | 142174.58 | 0.65 |
| pressure drop across tubing (psi) | 10.31 | 10.31 | 15.46 | 20.62 | 0.00 |
| fluid residence time at flow rate (secs) | 1.13 | 1.13 | 1.70 | 2.27 | 19.21 |
| Prandtl Number Pr for water at 20 deg C. (dimensionless) = Cp*viscosity/k | 6.78 | 6.78 | 6.78 | 6.78 | 6.78 |
| Nusselt No. Nu = 0.023R^0.8*Pr^0.4, turbulent flow | 93.80 | 93.80 | 93.80 | 93.80 | 16.65 |
| thermal conductivity of water at 20 deg. C. watt/cm/deg C. | 0.00604 | 0.00604 | 0.00604 | 0.00604 | 0.00604 |
| heat transfer coefficient watt/cm2/deg. C. | 1.24 | 1.24 | 1.24 | 1.24 | 0.03 |
| normalized film resistance (tube inner wall to water) (deg C./watt/cm2) | 0.807 | 0.807 | 0.807 | 0.807 | 39.467 |
| tube inner surface area (cm2) | 437.8 | 437.8 | 656.7 | 875.6 | 855.1 |
| tube outer surface area (cm2) | 608.0 | 608.0 | 912.1 | 1216.1 | 957.7 |
| thermal resistance from water to tube inner surface (deg. C./watt) | 0.00184 | 0.00184 | 0.00123 | 0.00092 | 0.04616 |
| percent of total thermal resistance - water to tube | 64% | 13% | 13% | 13% | 71% |
| thickness of tube wall (cm) | 0.089 | 0.089 | 0.089 | 0.089 | 0.238 |
| tubing material | 316L | QUARTZ | QUARTZ | QUARTZ | QUARTZ |
| tube material thermal conductivity (watt/cm-deg. C.) | 0.163 | 0.014 | 0.014 | 0.014 | 0.014 |
| normalized thermal resistance through the tube wall (deg C./watt/cm2) | 0.55 | 6.35 | 6.35 | 6.35 | 17.01 |
| average area of tube wall (cm2) | 523 | 523 | 784 | 1,046 | 906 |
| thermal resistance through the tube wall (deg C./watt) | 0.00104 | 0.01214 | 0.00810 | 0.00607 | 0.01877 |
| percent of total thermal resistance - tube wall | 36% | 87% | 87% | 87% | 29% |
| total thermal resistance (deg C./watt) | 0.00289 | 0.01399 | 0.00932 | 0.00699 | 0.06492 |
| total (normalized to external surface) thermal resistance (deg C./watt/cm2) | 1.75 | 8.50 | 8.50 | 8.50 | 62.17 |
| Power (watt) | 9000 | 9000 | 9000 | 9000 | 9000 |
| mass flow rate of water (grams/sec) | 44 | 44 | 44 | 44 | 44 |
| heat capacity of water | 4.179 | 4.179 | 4.179 | 4.179 | 4.179 |

TABLE 8-continued

Heater design performance calculations - applicable to tube heaters with resistance heated or induction heated elements bonded to the surface

| low volume, high performance heater design | Inventive Design A | Inventive Design B | Inventive Design C | Inventive Design D | Prior Art Design |
|---|---|---|---|---|---|
| Joules/gram/deg. C. | | | | | |
| temperature rise of water from inlet to outlet (deg. C.) | 48.89 | 48.89 | 48.89 | 48.89 | 48.89 |
| Power Density-Tube Exterior Surface (watts/cm2) | 14.80 | 14.80 | 9.87 | 7.40 | 9.40 |
| Power Density - Tube Exterior (watts/in2) | 95.49 | 95.49 | 63.66 | 47.75 | 60.63 |
| Aveage Fluid Temperature (inlet and outlet) | 34.45 | 34.45 | 34.45 | 34.45 | 34.45 |
| Temp.Diff. to Transfer Specified Power (deg. C.) | 25.98 | 125.88 | 83.92 | 62.94 | 584.30 |
| Average Element Temp. = Exterior Surface Temp. to Transfer Spec Power (deg. C.) | 60.42 | 160.32 | 118.37 | 97.39 | 618.75 |
| minimum element temperature (deg. C.) | 45.98 | 145.88 | 103.92 | 82.94 | 604.30 |
| maximum element temperature (deg. C.) | 94.87 | 194.77 | 152.81 | 131.83 | 653.19 |

Complete Heater Design Examples—Inventive Examples Compared to Prior Art

TABLE 9

Example 1 - Inventive Example

Inventive Example for 2.5 L/min flow

| | | | | | | |
|---|---|---|---|---|---|---|
| tubing ID (inches) (INPUTDATA) | 0.18 | 0.18 | 0.18 | 0.18 | 0.18 | 0.18 |
| tubing OD (inches) (INPUTDATA) | 0.25 | 0.25 | 0.25 | 0.25 | 0.25 | 0.25 |
| Inlet Temp T1 deg. C. (INPUT DATA) | 5 | 5 | 5 | 5 | 5 | 5 |
| Outlet Temp T2 deg. C. (INPUT DATA) | 35 | 40 | 45 | 50 | 60 | 70 |
| Req'd Temperature Rise deg. C. | 30 | 35 | 40 | 45 | 55 | 65 |
| Flow Rate L/min (INPUT DATA) | 2.5 | 2.5 | 2.5 | 2.5 | 2.5 | 2.5 |
| Flow Rate ml/sec | 41.67 | 41.67 | 41.67 | 41.67 | 41.67 | 41.67 |
| Req'd Power kW | 5.19 | 6.05 | 6.91 | 7.78 | 9.51 | 11.23 |
| Decay Constant Tau sec for given ozone-water solution temp.T2 | 79.4 | 52.9 | 35.7 | 24.3 | 11.7 | 5.9 |
| tubing ID (inches) | 0.18 | 0.18 | 0.18 | 0.18 | 0.18 | 0.18 |
| tubing OD (inches) | 0.25 | 0.25 | 0.25 | 0.25 | 0.25 | 0.25 |
| tubing wall thickness (inches) | 0.035 | 0.035 | 0.035 | 0.035 | 0.035 | 0.035 |
| tubing ID (cm) | 0.457 | 0.457 | 0.457 | 0.457 | 0.457 | 0.457 |
| tubing OD (cm) | 0.635 | 0.635 | 0.635 | 0.635 | 0.635 | 0.635 |
| tubing wall thickness (cm) | 0.089 | 0.089 | 0.089 | 0.089 | 0.089 | 0.089 |
| length of heated tube (in) scaled for given surf.pwr. density | 111.11 | 129.63 | 148.15 | 166.67 | 203.70 | 240.74 |
| length of heated tube (ft) | 9.26 | 10.80 | 12.35 | 13.89 | 16.98 | 20.06 |
| length of heated tube (cm) | 282.2 | 329.3 | 376.3 | 423.3 | 517.4 | 611.5 |
| volume of heated tube (cm3) = ml | 46.3 | 54.1 | 61.8 | 69.5 | 84.9 | 100.4 |
| liquid fluid material being heated | water | water | water | water | water | water |
| fluid inlet temperature (deg. C.) | 5 | 5 | 5 | 5 | 5 | 5 |
| fluid density rho (g/cm3) | 0.9974 | 0.9974 | 0.9974 | 0.9974 | 0.9974 | 0.9974 |
| fluid kinematic viscosity eta (g/cm-sec) | 9.80E−03 | 9.80E−03 | 9.80E−03 | 9.80E−03 | 9.80E−03 | 9.80E−03 |
| flow rate (liters/min) | 2.50 | 2.50 | 2.50 | 2.50 | 2.50 | 2.50 |
| flow rate(ml/sec) | 41.67 | 41.67 | 41.67 | 41.67 | 41.67 | 41.67 |
| tubing flow cross section area (cm2) | 0.1642 | 0.1642 | 0.1642 | 0.1642 | 0.1642 | 0.1642 |
| free stream velocity through tubing (cm/sec) | 253.80 | 253.80 | 253.80 | 253.80 | 253.80 | 253.80 |
| Re = density*free stream vel.*hydraulic.diam/kinem. viscosity | 11810 | 11810 | 11810 | 11810 | 11810 | 11810 |
| nozzle ID friction factor (turbulent flow-FIG. 6.4) | 0.0300 | 0.0300 | 0.0300 | 0.0300 | 0.0300 | 0.0300 |

TABLE 9-continued

Example 1 - Inventive Example

Inventive Example for 2.5 L/min flow

| | | | | | | |
|---|---|---|---|---|---|---|
| pressure drop across tubing (newtons/m2) Pascal | 59528 | 69450 | 79371 | 89292 | 109135 | 128978 |
| pressure drop across tubing (psi) | 8.63 | 10.07 | 11.51 | 12.95 | 15.82 | 18.70 |
| fluid residence time at flow rate (secs) | 1.11 | 1.30 | 1.48 | 1.67 | 2.04 | 2.41 |
| Prandtl No. Pr for water at 20 deg C. = Cp*viscos/k (dimensionless) | 6.78 | 6.78 | 6.78 | 6.78 | 6.78 | 6.78 |
| Nusselt No. Nu = $0.023 Re^{0.8} * Pr^{0.4}$, turbulent flow | 89.54 | 89.54 | 89.54 | 89.54 | 89.54 | 89.54 |
| thermal conductivity of water at 20 deg. C. watt/cm/deg C. | .00604 | .00604 | .00604 | .00604 | .00604 | .00604 |
| heat transfer coefficient watt/cm2/deg. C. | 1.18 | 1.18 | 1.18 | 1.18 | 1.18 | 1.18 |
| normalized film resis. (tube inner wall to water) (deg C./watt/cm2) | 0.845 | 0.845 | 0.845 | 0.845 | 0.845 | 0.845 |
| tube inner surface area (cm2) | 405.4 | 472.9 | 540.5 | 608.0 | 743.2 | 878.3 |
| tube outer surface area (cm2) | 563.0 | 656.8 | 750.7 | 844.5 | 1032.2 | 1219.9 |
| thermal resistance from water to tube inner surface (deg. C./watt) | .00209 | .00179 | .00156 | .00139 | .00114 | .00096 |
| percent of total thermal resistance - water to tube | 14% | 14% | 14% | 14% | 14% | 14% |
| thickness of tube wall (cm) | 0.089 | 0.089 | 0.089 | 0.089 | 0.089 | 0.089 |
| tubing material | QRTZ | QRTZ | QRTZ | QRTZ | QRTZ | QRTZ |
| tube material thermal conductivity (watt/cm-deg. C.) | 0.014 | 0.014 | 0.014 | 0.014 | 0.014 | 0.014 |
| normalized thermal resis. through the tube wall (deg C./watt/cm2) | 6.35 | 6.35 | 6.35 | 6.35 | 6.35 | 6.35 |
| average area of tube wall (cm2) | 484 | 565 | 646 | 726 | 888 | 1,049 |
| thermal resistance through the tube wall (deg C./watt) | .01311 | .01124 | .00984 | .00874 | .00715 | .00605 |
| percent of total thermal resistance - tube wall | 86% | 86% | 86% | 86% | 86% | 86% |
| total thermal resistance (deg C./watt) | .01520 | .01303 | .01140 | .01013 | .00829 | .00702 |
| total (normalized to ext. surf.) therm. resist.(deg C./watt/cm2) | 8.56 | 8.56 | 8.56 | 8.56 | 8.56 | 8.56 |
| Transferred Power (watt) | 5185 | 6049 | 6914 | 7778 | 9506 | 11235 |
| Transferred Volume Power Density (watt/cm3) | 112 | 112 | 112 | 112 | 112 | 112 |
| mass flow rate of water (grams/sec) | 42 | 42 | 42 | 42 | 42 | 42 |
| heat capacity of water Joules/gram/deg. C. | 4.179 | 4.179 | 4.179 | 4.179 | 4.179 | 4.179 |
| temperature rise of water from inlet to outlet (deg. C.) | 29.86 | 34.83 | 39.81 | 44.78 | 54.74 | 64.69 |
| Surface Power Density-Tube Exterior Surface (watts/cm2) | 9.21 | 9.21 | 9.21 | 9.21 | 9.21 | 9.21 |
| Surface Power Density - Tube Exterior (watts/in2) | 59.42 | 59.42 | 59.42 | 59.42 | 59.42 | 59.42 |
| Aveage Fluid Temperature (inlet and outlet) | 17.43 | 19.92 | 22.40 | 24.89 | 29.87 | 34.84 |
| Temp. Diff. to Transfer Specified Power (deg. C.) | 78.82 | 78.82 | 78.82 | 78.82 | 78.82 | 78.82 |
| Avg. Element Temp. = Ext. Surf. Temp. to XFR Spec Pwr. (deg. C.) | 96.24 | 98.73 | 101.22 | 103.71 | 108.68 | 113.66 |
| minimum element temperature (deg. C.) | 83.82 | 83.82 | 83.82 | 83.82 | 83.82 | 83.82 |
| maximum element temperature (deg. C.) | 113.67 | 118.65 | 123.62 | 128.60 | 138.55 | 148.50 |
| outlet diss. ozone concentration/inlet diss. ozone concentration | 0.99 | 0.98 | 0.96 | 0.93 | 0.84 | 0.67 |

TABLE 10

Example 2 - Inventive Example

Inventive Example for 5.0 L/min flow

| | | | | | | |
|---|---|---|---|---|---|---|
| tubing ID (inches) | 0.305 | 0.305 | 0.305 | 0.305 | 0.305 | 0.305 |
| tubing OD (inches) | 0.375 | 0.375 | 0.375 | 0.375 | 0.375 | 0.375 |

TABLE 10-continued

Example 2 - Inventive Example

Inventive Example for 5.0 L/min flow

| | | | | | | |
|---|---|---|---|---|---|---|
| Inlet Temp T1 deg. C. | 5 | 5 | 5 | 5 | 5 | 5 |
| Outlet Temp T2 deg. C. | 35 | 40 | 45 | 50 | 60 | 70 |
| Req'd Temperature Rise deg. C. | 30 | 35 | 40 | 45 | 55 | 65 |
| Flow Rate L/min | 5 | 5 | 5 | 5 | 5 | 5 |
| Flow Rate ml/sec | 83.3 | 83.3 | 83.3 | 83.3 | 83.3 | 83.3 |
| Req'd Power kW | 10.37 | 12.10 | 13.83 | 15.56 | 19.01 | 22.47 |
| Decay Constant Tau sec for given ozone-water solution temp.T2 | 79.4 | 52.9 | 35.7 | 24.3 | 11.7 | 5.9 |
| tubing ID (inches) | 0.305 | 0.305 | 0.305 | 0.305 | 0.305 | 0.305 |
| tubing OD (inches) | 0.375 | 0.375 | 0.375 | 0.375 | 0.375 | 0.375 |
| tubing wall thickness (inches) | 0.035 | 0.035 | 0.035 | 0.035 | 0.035 | 0.035 |
| tubing ID (cm) | 0.775 | 0.775 | 0.775 | 0.775 | 0.775 | 0.775 |
| tubing OD (cm) | 0.953 | 0.953 | 0.953 | 0.953 | 0.953 | 0.953 |
| tubing wall thickness (cm) | 0.089 | 0.089 | 0.089 | 0.089 | 0.089 | 0.089 |
| length of heated tube (in) scaled for given surf.pwr. density | 75.00 | 87.50 | 100.00 | 112.50 | 137.50 | 162.50 |
| length of heated tube (ft) | 6.25 | 7.29 | 8.33 | 9.37 | 11.46 | 13.54 |
| length of heated tube (cm) | 190.5 | 222.2 | 254.0 | 285.7 | 349.2 | 412.7 |
| volume of heated tube (cm3) = ml | 89.8 | 104.8 | 119.7 | 134.7 | 164.6 | 194.6 |
| liquid fluid material being heated | water | water | water | water | water | water |
| fluid inlet temperature (deg. C.) | 5 | 5 | 5 | 5 | 5 | 5 |
| fluid density rho (g/cm3) | 0.9974 | 0.9974 | 0.9974 | 0.9974 | 0.9974 | 0.9974 |
| fluid kinematic viscosity eta (g/cm-sec) | 9.80E−03 | 9.80E−03 | 9.80E−03 | 9.80E−03 | 9.80E−03 | 9.80E−03 |
| flow rate (liters/min) | 5.00 | 5.00 | 5.00 | 5.00 | 5.00 | 5.00 |
| flow rate (ml/sec) | 83.33 | 83.33 | 83.33 | 83.33 | 83.33 | 83.33 |
| tubing flow cross section area (cm2) | 0.4714 | 0.4714 | 0.4714 | 0.4714 | 0.4714 | 0.4714 |
| free stream velocity through tubing (cm/sec) | 176.79 | 176.79 | 176.79 | 176.79 | 176.79 | 176.79 |
| Re = density*free stream vel.*hydraulic.diam/kinem. viscosity | 13939 | 13939 | 13939 | 13939 | 13939 | 13939 |
| nozzle ID friction factor (turbulent flow - FIG. 6.4) | 0.0287 | 0.0287 | 0.0287 | 0.0287 | 0.0287 | 0.0287 |
| pressure drop across tubing (newtons/m2) Pascal | 11001 | 12835 | 14668 | 16502 | 20169 | 23836 |
| pressure drop across tubing (psi) | 1.60 | 1.86 | 2.13 | 2.39 | 2.92 | 3.46 |
| fluid residence time at flow rate (secs) | 1.08 | 1.26 | 1.44 | 1.62 | 1.98 | 2.33 |
| Prandtl No. Pr for water at 20 deg C. = Cp*viscos/k (dimensionless) | 6.78 | 6.78 | 6.78 | 6.78 | 6.78 | 6.78 |
| Nusselt No. Nu = $0.023 Re^{0.8} Pr^{0.4}$, turbulent flow | 102.24 | 102.24 | 102.24 | 102.24 | 102.24 | 102.24 |
| thermal conductivity of water at 20 deg. C. watt/cm/deg C. | .00604 | .00604 | .00604 | .00604 | .00604 | .00604 |
| heat transfer coefficient watt/cm2/deg. C. | 0.80 | 0.80 | 0.80 | 0.80 | 0.80 | 0.80 |
| normalized film resis. (tube inner wall to water) (deg C./watt/cm2) | 1.255 | 1.255 | 1.255 | 1.255 | 1.255 | 1.255 |
| tube inner surface area (cm2) | 463.6 | 540.9 | 618.2 | 695.4 | 850.0 | 1004.5 |
| tube outer surface area (cm2) | 570.0 | 665.0 | 760.1 | 855.1 | 1045.1 | 1235.1 |
| thermal resist. from water to tube inner surface (deg. C./watt) | .00271 | .00232 | .00203 | .00180 | .00148 | .00125 |
| percent of total thermal resistance - water to tube | 18% | 18% | 18% | 18% | 18% | 18% |
| thickness of tube wall (cm) | 0.089 | 0.089 | 0.089 | 0.089 | 0.089 | 0.089 |
| tubing material | QRTZ | QRTZ | QRTZ | QRTZ | QRTZ | QRTZ |
| tube material thermal conductivity (watt/cm-deg. C.) | 0.014 | 0.014 | 0.014 | 0.014 | 0.014 | 0.014 |
| normalized thermal resis. through the tube wall (deg C./watt/cm2) | 6.35 | 6.35 | 6.35 | 6.35 | 6.35 | 6.35 |
| average area of tube wall (cm2) | 517 | 603 | 689 | 775 | 948 | 1,120 |
| thermal resistance through the tube wall (deg C./watt) | .01229 | .01053 | .00921 | .00819 | .00670 | .00567 |
| percent of total thermal resistance - tube wall | 82% | 82% | 82% | 82% | 82% | 82% |
| total thermal resistance (deg C./watt) | .01499 | .01285 | .01124 | .00999 | .00818 | .00692 |
| total (normalized to ext. surf.) therm. resist.(deg C./watt/cm2) | 8.55 | 8.55 | 8.55 | 8.55 | 8.55 | 8.55 |
| Transferred Power (watt) | 10370 | 12099 | 13827 | 15556 | 19012 | 22469 |
| Transferred Volume Power Density (watt/cm3) | 115 | 115 | 115 | 115 | 115 | 115 |
| mass flow rate of water (grams/sec) | 83 | 83 | 83 | 83 | 83 | 83 |
| heat capacity of water | 4.179 | 4.179 | 4.179 | 4.179 | 4.179 | 4.179 |

TABLE 10-continued

Example 2 - Inventive Example

Inventive Example for 5.0 L/min flow

| Joules/gram/deg. C. | | | | | | |
|---|---|---|---|---|---|---|
| temperature rise of water from inlet to outlet (deg. C.) | 29.86 | 34.83 | 39.81 | 44.78 | 54.74 | 64.69 |
| Surface Power Density-Tube Exterior Surface (watts/cm2) | 18.19 | 18.19 | 18.19 | 18.19 | 18.19 | 18.19 |
| Surface Power Density - Tube Exterior (watts/in2) | 117.37 | 117.37 | 117.37 | 117.37 | 117.37 | 117.37 |
| Aveage Fluid Temperature (inlet and outlet) | 17.43 | 19.92 | 22.40 | 24.89 | 29.87 | 34.84 |
| Temp.Diff. to Transfer Specified Power (deg. C.) | 155.48 | 155.48 | 155.48 | 155.48 | 155.48 | 155.48 |
| Avg. Element Temp. = Ext. Surf. Temp. to XFR Spec Pwr. (deg. C.) | 172.90 | 175.39 | 177.88 | 180.37 | 185.34 | 190.32 |
| minimum element temperature (deg. C.) | 160.48 | 160.48 | 160.48 | 160.48 | 160.48 | 160.48 |
| maximum element temperature (deg. C.) | 190.33 | 195.31 | 200.28 | 205.26 | 215.21 | 225.16 |
| outlet diss. ozone concentration/inlet diss. ozone concentration | 0.99 | 0.98 | 0.96 | 0.94 | 0.85 | 0.67 |

TABLE 11

Example 3 - Inventive Example

Inventive Example for 10.0 L/min flow

| | | | | | | |
|---|---|---|---|---|---|---|
| tubing ID (inches) | 0.305 | 0.305 | 0.305 | 0.305 | 0.305 | 0.305 |
| tubing OD (inches) | 0.375 | 0.375 | 0.375 | 0.375 | 0.375 | 0.375 |
| Inlet Temp T1 deg. C. | 5 | 5 | 5 | 5 | 5 | 5 |
| Outlet Temp T2 deg. C. | 35 | 40 | 45 | 50 | 60 | 70 |
| Req'd Temperature Rise deg. C. | 30 | 35 | 40 | 45 | 55 | 65 |
| Flow Rate L/min | 10 | 10 | 10 | 10 | 10 | 10 |
| Flow Rate ml/sec | 166.7 | 166.7 | 166.7 | 166.7 | 166.7 | 166.7 |
| Req' d Power kW | 20.74 | 24.20 | 27.65 | 31.11 | 38.02 | 44.94 |
| Decay Constant Tau sec for given ozone-water solution temp.T2 | 79.4 | 52.9 | 35.7 | 24.3 | 11.7 | 5.9 |
| tubing ID (inches) | 0.305 | 0.305 | 0.305 | 0.305 | 0.305 | 0.305 |
| tubing OD (inches) | 0.375 | 0.375 | 0.375 | 0.375 | 0.375 | 0.375 |
| tubing wall thickness (inches) | 0.035 | 0.035 | 0.035 | 0.035 | 0.035 | 0.035 |
| tubing ID (cm) | 0.775 | 0.775 | 0.775 | 0.775 | 0.775 | 0.775 |
| tubing OD (cm) | 0.953 | 0.953 | 0.953 | 0.953 | 0.953 | 0.953 |
| tubing wall thickness (cm) | 0.089 | 0.089 | 0.089 | 0.089 | 0.089 | 0.089 |
| length of heated tube (in) scaled for given surf.pwr. density | 150.00 | 175.00 | 200.00 | 225.00 | 275.00 | 325.00 |
| length of heated tube (ft) | 12.50 | 14.58 | 16.67 | 18.75 | 22.92 | 27.08 |
| length of heated tube (cm) | 381.0 | 444.5 | 508.0 | 571.5 | 698.5 | 825.5 |
| volume of heated tube (cm3) = ml | 179.6 | 209.5 | 239.5 | 269.4 | 329.2 | 389.1 |
| liquid fluid material being heated | water | water | water | water | water | water |
| fluid inlet temperature (deg. C.) | 5 | 5 | 5 | 5 | 5 | 5 |
| fluid density rho (g/cm3) | 0.9974 | 0.9974 | 0.9974 | 0.9974 | 0.9974 | 0.9974 |
| fluid kinematic viscosity eta (g/cm-sec) | 9.80E−03 | 9.80E−03 | 9.80E−03 | 9.80E−03 | 9.80E−03 | 9.80E−03 |
| flow rate (liters/min) | 10.00 | 10.00 | 10.00 | 10.00 | 10.00 | 10.00 |
| flow rate (ml/sec) | 166.67 | 166.67 | 166.67 | 166.67 | 166.67 | 166.67 |
| tubing flow cross section area (cm2) | 0.4714 | 0.4714 | 0.4714 | 0.4714 | 0.4714 | 0.4714 |
| free stream velocity through tubing (cm/sec) | 353.58 | 353.58 | 353.58 | 353.58 | 353.58 | 353.58 |
| Re = density*free stream vel.*hydraulic.diam/kinem. viscosity | 27878 | 27878 | 27878 | 27878 | 27878 | 27878 |
| nozzle ID friction factor (turbulent flow - FIG. 6.4) | 0.0240 | 0.0240 | 0.0240 | 0.0240 | 0.0240 | 0.0240 |
| pressure drop across tubing (newtons/m2) Pascal | 73695 | 85977 | 98259 | 110542 | 135107 | 159672 |
| pressure drop across tubing (psi) | 10.69 | 12.47 | 14.25 | 16.03 | 19.59 | 23.15 |
| fluid residence time at flow rate (secs) | 1.08 | 1.26 | 1.44 | 1.62 | 1.98 | 2.33 |
| Prandtl No. Pr for water at 20 deg C = Cp*viscos/k (dimensionless) | 6.78 | 6.78 | 6.78 | 6.78 | 6.78 | 6.78 |

TABLE 11-continued

Example 3 - Inventive Example

Inventive Example for 10.0 L/min flow

| | | | | | | |
|---|---|---|---|---|---|---|
| Nusselt No. Nu = 0.023Re^0.8*Pr^0.4, turbulent flow | 178.01 | 178.01 | 178.01 | 178.01 | 178.01 | 178.01 |
| thermal conductivity of water at 20 deg. C. watt/cm/deg C. | .00604 | .00604 | .00604 | .00604 | .00604 | .00604 |
| heat transfer coefficient watt/cm2/deg. C. | 1.39 | 1.39 | 1.39 | 1.39 | 1.39 | 1.39 |
| normalized film resis. (tube inner wall to water) (deg C./watt/cm2) | 0.721 | 0.721 | 0.721 | 0.721 | 0.721 | 0.721 |
| tube inner surface area (cm2) | 927.3 | 1081.8 | 1236.3 | 1390.9 | 1700.0 | 2009.1 |
| tube outer surface area (cm2) | 1140.1 | 1330.1 | 1520.1 | 1710.1 | 2090.1 | 2470.2 |
| thermal resist. from water to tube inner surface (deg. C./watt) | .00078 | .00067 | .00058 | .00052 | .00042 | .00036 |
| percent of total thermal resistance - water to tube | 11% | 11% | 11% | 11% | 11% | 11% |
| thickness of tube wall (cm) | 0.089 | 0.089 | 0.089 | 0.089 | 0.089 | 0.089 |
| tubing material | QRTZ | QRTZ | QRTZ | QRTZ | QRTZ | QRTZ |
| tube material thermal conductivity (watt/cm-deg. C.) | 0.014 | 0.014 | 0.014 | 0.014 | 0.014 | 0.014 |
| normalized thermal resis. through the tube wall (deg C./watt/cm2) | 6.35 | 6.35 | 6.35 | 6.35 | 6.35 | 6.35 |
| average area of tube wall (cm2) | 1,034 | 1,206 | 1,378 | 1,551 | 1,895 | 2,240 |
| thermal resistance through the tube wall (deg C./watt) | .00614 | .00527 | .00461 | .00410 | .00335 | .00284 |
| percent of total thermal resistance - tube wall | 89% | 89% | 89% | 89% | 89% | 89% |
| total thermal resistance (deg C./watt) | .00692 | .00593 | .00519 | .00461 | .00377 | .00319 |
| total (normalized to ext. surf.) therm. resist. (deg C./watt/cm2) | 7.89 | 7.89 | 7.89 | 7.89 | 7.89 | 7.89 |
| Transferred Power (watt) | 20741 | 24198 | 27654 | 31111 | 38025 | 44938 |
| Transferred Volume Power Density (watt/cm3) | 115 | 115 | 115 | 115 | 115 | 115 |
| mass flow rate of water (grams/sec) | 166 | 166 | 166 | 166 | 166 | 166 |
| heat capacity of water Joules/gram/deg. C. | 4.179 | 4.179 | 4.179 | 4.179 | 4.179 | 4.179 |
| temperature rise of water from inlet to outlet (deg. C.) | 29.86 | 34.83 | 39.81 | 44.78 | 54.74 | 64.69 |
| Surface Power Density - Tube Exterior Surface (watts/cm2) | 18.19 | 18.19 | 18.19 | 18.19 | 18.19 | 18.19 |
| Surface Power Density-Tube Exterior (watts/in2) | 117.37 | 117.37 | 117.37 | 117.37 | 117.37 | 117.37 |
| Aveage Fluid Temperature (inlet and outlet) | 17.43 | 19.92 | 22.40 | 24.89 | 29.87 | 34.84 |
| Temp.Diff. to Transfer Specified Power (deg. C.) | 143.53 | 143.53 | 143.53 | 143.53 | 143.53 | 143.53 |
| Avg. Element Temp. = Ext. Surf. Temp. to XFR Spec Pwr. (deg. C.) | 160.96 | 163.45 | 165.93 | 168.42 | 173.40 | 178.37 |
| minimum element temperature (deg. C.) | 148.53 | 148.53 | 148.53 | 148.53 | 148.53 | 148.53 |
| maximum element temperature (deg.C.) | 178.39 | 183.36 | 188.34 | 193.31 | 203.27 | 213.22 |
| outletdiss. ozone concentration/inlet diss. ozone concentration | 0.99 | 0.98 | 0.96 | 0.94 | 0.85 | 0.67 |

TABLE 12

Example 4 - Prior Art Design

Prior Art Example for 2.5 L/min flow

| | | | | | | |
|---|---|---|---|---|---|---|
| tubing ID (inches) | 1.5625 | 1.5625 | 1.5625 | 1.5625 | 1.5625 | 1.5625 |
| tubing OD (inches) | 1.75 | 1.75 | 1.75 | 1.75 | 1.75 | 1.75 |
| Inlet Temp T1 deg. C. | 5 | 5 | 5 | 5 | 5 | 5 |
| Outlet Temp T2 deg. C. | 35 | 40 | 45 | 50 | 60 | 70 |
| Req'd Temperature Rise deg. C. | 30 | 35 | 40 | 45 | 55 | 65 |
| Flow Rate L/min | 2.5 | 2.5 | 2.5 | 2.5 | 2.5 | 2.5 |
| Flow Rate ml/sec | 41.7 | 41.7 | 41.7 | 41.7 | 41.7 | 41.7 |
| Req'd Power kW | 5.19 | 6.05 | 6.91 | 7.78 | 9.51 | 11.23 |
| Decay Constant Tau sec for given ozone-water solution temp.T2 | 79.4 | 52.9 | 35.7 | 24.3 | 11.7 | 5.9 |

TABLE 12-continued

Example 4 - Prior Art Design

Prior Art Example for 2.5 L/min flow

| | | | | | | |
|---|---|---|---|---|---|---|
| tubing ID (inches) | 1.5625 | 1.5625 | 1.5625 | 1.5625 | 1.5625 | 1.5625 |
| tubing OD (inches) | 1.75 | 1.75 | 1.75 | 1.75 | 1.75 | 1.75 |
| tubing wall thickness (inches) | .09375 | .09375 | .09375 | .09375 | .09375 | .09375 |
| tubing ID (cm) | 3.969 | 3.969 | 3.969 | 3.969 | 3.969 | 3.969 |
| tubing OD (cm) | 4.445 | 4.445 | 4.445 | 4.445 | 4.445 | 4.445 |
| tubing wall thickness (cm) | 0.238 | 0.238 | 0.238 | 0.238 | 0.238 | 0.238 |
| length of heated tube (in) scaled for given surf.pwr. density | 15.56 | 18.15 | 20.74 | 23.33 | 28.52 | 33.70 |
| length of heated tube (ft) | 1.30 | 1.51 | 1.73 | 1.94 | 2.38 | 2.81 |
| length of heated tube (cm) | 39.5 | 46.1 | 52.7 | 59.3 | 72.4 | 85.6 |
| volume of heated tube (cm3) = ml | 488.8 | 570.2 | 651.7 | 733.2 | 896.1 | 1059.0 |
| liquid fluid material being heated | water | water | water | water | water | water |
| fluid inlet temperature (deg. C.) | 5 | 5 | 5 | 5 | 5 | 5 |
| fluid density rho (g/cm3) | 0.9974 | 0.9974 | 0.9974 | 0.9974 | 0.9974 | 0.9974 |
| fluid kinematic viscosity eta (g/cm-sec) | 9.80E−03 | 9.80E−03 | 9.80E−03 | 9.80E−03 | 9.80E−03 | 9.80E−03 |
| flow rate (liters/min) | 2.50 | 2.50 | 2.50 | 2.50 | 2.50 | 2.50 |
| flow rate (ml/sec) | 41.67 | 41.67 | 41.67 | 41.67 | 41.67 | 41.67 |
| tubing flow cross section area (cm2) | 12.371 | 12.371 | 12.371 | 12.371 | 12.371 | 12.371 |
| free stream velocity through tubing (cm/sec) | 3.37 | 3.37 | 3.37 | 3.37 | 3.37 | 3.37 |
| Re = density*free stream vel.*hydraulic.diam/kinem. viscosity | 1360 | 1360 | 1360 | 1360 | 1360 | 1360 |
| nozzle ID friction factor (turbulent flow - FIG. 6.4) | 0.0606 | 0.0606 | 0.0606 | 0.0606 | 0.0606 | 0.0606 |
| pressure drop across tubing (newtons/m2) Pascal | 0.34 | 0.40 | 0.45 | 0.51 | 0.63 | 0.74 |
| pressure drop across tubing (psi) | 0.00 | 0.00 | 0.00 | 0.00 | 0.00 | 0.00 |
| fluid residence time at flow rate (secs) | 11.73 | 13.69 | 15.64 | 17.60 | 21.51 | 25.42 |
| Prandtl No. Pr for water at 20 deg C. = Cp*viscos/k (dimensionless) | 6.78 | 6.78 | 6.78 | 6.78 | 6.78 | 6.78 |
| Nusselt No. Nu = 0.023Re^0.8*Pr^0.4, turbulent flow | 15.89 | 15.89 | 15.89 | 15.89 | 15.89 | 15.89 |
| thermal conductivity of water at 20 deg. C. watt/cm/deg C. | .00604 | .00604 | .00604 | .00604 | .00604 | .00604 |
| heat transfer coefficient watt/cm2/deg. C. | 0.02 | 0.02 | 0.02 | 0.02 | 0.02 | 0.02 |
| normalized film resis. (tube inner wall to water) (deg C./watt/cm2) | 41.347 | 41.347 | 41.347 | 41.347 | 41.347 | 41.347 |
| tube inner surface area (cm2) | 492.6 | 574.7 | 656.8 | 738.9 | 903.2 | 1067.4 |
| tube outer surface area (cm2) | 551.7 | 643.7 | 735.7 | 827.6 | 1011.5 | 1195.5 |
| thermal resistance from water to tube inner surface (deg. C./watt) | .08393 | .07194 | .06295 | .05595 | .04578 | .03874 |
| percent of total thermal resistance - water to tube | 72% | 72% | 72% | 72% | 72% | 72% |
| thickness of tube wall (cm) | 0.238 | 0.238 | 0.238 | 0.238 | 0.238 | 0.238 |
| tubing material | QRTZ | QRTZ | QRTZ | QRTZ | QRTZ | QRTZ |
| tube material thermal conductivity (watt/cm-deg. C.) | 0.014 | 0.014 | 0.014 | 0.014 | 0.014 | 0.014 |
| normalized thermal resis. through the tube wall (deg C./watt/cm2) | 17.01 | 17.01 | 17.01 | 17.01 | 17.01 | 17.01 |
| average area of tube wall (cm2) | 522 | 609 | 696 | 783 | 957 | 1,131 |
| thermal resistance through the tube wall (deg C./watt) | .03257 | .02792 | .02443 | .02171 | .01777 | .01503 |
| percent of total thermal resistance - tube wall | 28% | 28% | 28% | 28% | 28% | 28% |
| total thermal resistance (deg C./watt) | .11650 | .09986 | .08738 | .07767 | .06355 | .05377 |
| total (normalized to ext. surf.) therm. resist.(deg C./watt/cm2) | 64.28 | 64.28 | 64.28 | 64.28 | 64.28 | 64.28 |
| Transferred Power (watt) | 5185 | 6049 | 6914 | 7778 | 9506 | 11235 |
| Transferred Volume Power Density (watt/cm3) | 11 | 11 | 11 | 11 | 11 | 11 |
| mass flow rate of water (grams/sec) | 42 | 42 | 42 | 42 | 42 | 42 |
| heat capacity of water Joules/gram/deg. C. | 4.179 | 4.179 | 4.179 | 4.179 | 4.179 | 4.179 |
| temperature rise of water from inlet to outlet (deg. C.) | 29.86 | 34.83 | 39.81 | 44.78 | 54.74 | 64.69 |
| Surface Power Density-Tube Exterior Surface (watts/cm2) | 9.40 | 9.40 | 9.40 | 9.40 | 9.40 | 9.40 |
| Surface Power Density-Tube Exterior (watts/in2) | 60.63 | 60.63 | 60.63 | 60.63 | 60.63 | 60.63 |

TABLE 12-continued

Example 4 - Prior Art Design

Prior Art Example for 2.5 L/min flow

| | | | | | | |
|---|---|---|---|---|---|---|
| Aveage Fluid Temperature (inlet and outlet) | 17.43 | 19.92 | 22.40 | 24.89 | 29.87 | 34.84 |
| Temp.Diff. to Transfer Specified Power (deg. C.) | 604.09 | 604.09 | 604.09 | 604.09 | 604.09 | 604.09 |
| Avg. Element Temp. = Ext. Surf. Temp. to XFR Spec Pwr. (deg. C.) | 621.52 | 624.01 | 626.50 | 628.99 | 633.96 | 638.94 |
| minimum element temperature (deg. C.) | 609.09 | 609.09 | 609.09 | 609.09 | 609.09 | 609.09 |
| maximum element temperature (deg. C.) | 638.95 | 643.93 | 648.90 | 653.88 | 663.83 | 673.78 |
| outlet diss. ozone concentration/inlet diss. ozone concentration | 0.86 | 0.77 | 0.64 | 0.49 | 0.16 | 0.01 |

TABLE 13

Example 5 - Prior Art Design

Prior Art Example for 5.0 L/min flow

| | | | | | | |
|---|---|---|---|---|---|---|
| tubing ID (inches) | 1.5625 | 1.5625 | 1.5625 | 1.5625 | 1.5625 | 1.5625 |
| tubing OD (inches) | 1.75 | 1.75 | 1.75 | 1.75 | 1.75 | 1.75 |
| Inlet Temp T1 deg. C. | 5 | 5 | 5 | 5 | 5 | 5 |
| Outlet Temp T2 deg. C. | 35 | 40 | 45 | 50 | 60 | 70 |
| Req'd Temperature Rise deg. C. | 30 | 35 | 40 | 45 | 55 | 65 |
| Flow Rate L/min | 5 | 5 | 5 | 5 | 5 | 5 |
| Flow Rate ml/sec | 83.3 | 83.3 | 83.3 | 83.3 | 83.3 | 83.3 |
| Req'd Power kW | 10.37 | 12.10 | 13.83 | 15.56 | 19.01 | 22.47 |
| Decay Constant Tau sec for given ozone-water solution temp.T2 | 79.4 | 52.9 | 35.7 | 24.3 | 11.7 | 5.9 |
| tubing ID (inches) | 1.5625 | 1.5625 | 1.5625 | 1.5625 | 1.5625 | 1.5625 |
| tubing OD (inches) | 1.75 | 1.75 | 1.75 | 1.75 | 1.75 | 1.75 |
| tubing wall thickness (inches) | .09375 | .09375 | .09375 | .09375 | .09375 | .09375 |
| tubing ID (cm) | 3.969 | 3.969 | 3.969 | 3.969 | 3.969 | 3.969 |
| tubing OD (cm) | 4.445 | 4.445 | 4.445 | 4.445 | 4.445 | 4.445 |
| tubing wall thickness (cm) | 0.238 | 0.238 | 0.238 | 0.238 | 0.238 | 0.238 |
| length of heated tube (in) scaled for given surf.pwr. density | 31.11 | 36.30 | 41.48 | 46.67 | 57.04 | 67.41 |
| length of heated tube (ft) | 2.59 | 3.02 | 3.46 | 3.89 | 4.75 | 5.62 |
| length of heated tube (cm) | 79.0 | 92.2 | 105.4 | 118.5 | 144.9 | 171.2 |
| volume of heated tube (cm3) = ml | 977.6 | 1140.5 | 1303.4 | 1466.3 | 1792.2 | 2118.1 |
| liquid fluid material being heated | water | water | water | water | water | water |
| fluid inlet temperature (deg. C.) | 5 | 5 | 5 | 5 | 5 | 5 |
| fluid density rho (g/cm3) | 0.9974 | 0.9974 | 0.9974 | 0.9974 | 0.9974 | 0.9974 |
| fluid kinematic viscosity eta (g/cm-sec) | 9.80E−03 | 9.80E−03 | 9.80E−03 | 9.80E−03 | 9.80E−03 | 9.80E−03 |
| flow rate (liters/min) | 5.00 | 5.00 | 5.00 | 5.00 | 5.00 | 5.00 |
| flow rate (ml/sec) | 83.33 | 83.33 | 83.33 | 83.33 | 83.33 | 83.33 |
| tubing flow cross section area (cm2) | 12.371 | 12.371 | 12.371 | 12.371 | 12.371 | 12.371 |
| free stream velocity through tubing (cm/sec) | 6.74 | 6.74 | 6.74 | 6.74 | 6.74 | 6.74 |
| Re = density*free stream vel.*hydraulic.diam/kinem. viscosity | 2721 | 2721 | 2721 | 2721 | 2721 | 2721 |
| nozzle ID friction factor (turbulent flow - FIG. 6.4) | 0.0470 | 0.0470 | 0.0470 | 0.0470 | 0.0470 | 0.0470 |
| pressure drop across tubing (newtons/m2) Pascal | 2.12 | 2.47 | 2.83 | 3.18 | 3.89 | 4.59 |
| pressure drop across tubing (psi) | 0.00 | 0.00 | 0.00 | 0.00 | 0.00 | 0.00 |
| fluid residence time at flow rate (secs) | 11.73 | 13.69 | 15.64 | 17.60 | 21.51 | 25.42 |
| Prandtl No. Pr for water at 20 deg C. = Cp*viscos/k (dimensionless) | 6.78 | 6.78 | 6.78 | 6.78 | 6.78 | 6.78 |
| Nusselt No. Nu = 0.023Re^0.8*Pr^0.4, turbulent flow | 27.67 | 27.67 | 27.67 | 27.67 | 27.67 | 27.67 |
| thermal conductivity of water at 20 deg. C watt/cm/deg C. | .00604 | .00604 | .00604 | .00604 | .00604 | .00604 |
| heat transfer coefficient watt/cm2/deg. C. | 0.04 | 0.04 | 0.04 | 0.04 | 0.04 | 0.04 |
| normalized film resis. (tube inner wall to water) (deg. C./watt/cm2) | 23.748 | 23.748 | 23.748 | 23.748 | 23.748 | 23.748 |
| tube inner surface area (cm2) | 985.3 | 1149.5 | 1313.7 | 1477.9 | 1806.3 | 2134.7 |
| tube outer surface area (cm2) | 1103.5 | 1287.4 | 1471.3 | 1655.2 | 2023.1 | 2390.9 |

TABLE 13-continued

Example 5 - Prior Art Design

Prior Art Example for 5.0 L/min flow

| | | | | | | |
|---|---|---|---|---|---|---|
| thermal resistance from water to tube inner surface (deg. C./watt) | .02410 | .02066 | .01808 | .01607 | .01315 | .01112 |
| percent of total thermal resistance - water to tube | 60% | 60% | 60% | 60% | 60% | 60% |
| thickness of tube wall (cm) | 0.238 | 0.238 | 0.238 | 0.238 | 0.238 | 0.238 |
| tubing material | QRTZ | QRTZ | QRTZ | QRTZ | QRTZ | QRTZ |
| tube material thermal conductivity (watt/cm-deg. C.) | 0.014 | 0.014 | 0.014 | 0.014 | 0.014 | 0.014 |
| normalized thermal resis. through the tube wall (deg C./watt/cm2) | 17.01 | 17.01 | 17.01 | 17.01 | 17.01 | 17.01 |
| average area of tube wall (cm2) | 1,044 | 1,218 | 1,393 | 1,567 | 1,915 | 2,263 |
| thermal resistance through the tube wall (deg C./watt) | 0.01629 | 0.01396 | 0.01221 | 0.01086 | 0.00888 | 0.00752 |
| percent of total thermal resistance - tube wall | 40% | 40% | 40% | 40% | 40% | 40% |
| total thermal resistance (deg C./watt) | 0.04039 | 0.03462 | 0.03029 | 0.02693 | 0.02203 | 0.01864 |
| total (normalized to ext. surf.) therm. resist.(deg C./watt/cm2) | 44.57 | 44.57 | 44.57 | 44.57 | 44.57 | 44.57 |
| Transferred Power (watt) | 10370 | 12099 | 13827 | 15556 | 19012 | 22469 |
| Transferred Volume Power Density (watt/cm3) | 11 | 11 | 11 | 11 | 11 | 11 |
| mass flow rate of water (grams/sec) | 83 | 83 | 83 | 83 | 83 | 83 |
| heat capacity of water Joules/gram/deg. C. | 4.179 | 4.179 | 4.179 | 4.179 | 4.179 | 4.179 |
| temperature rise of water from inlet to outlet (deg. C.) | 29.86 | 34.83 | 39.81 | 44.78 | 54.74 | 64.69 |
| Surface Power Density - Tube Exterior Surface (watts/cm2) | 9.40 | 9.40 | 9.40 | 9.40 | 9.40 | 9.40 |
| Surface Power Density-Tube Exterior (watts/in2) | 60.63 | 60.63 | 60.63 | 60.63 | 60.63 | 60.63 |
| Aveage Fluid Temperature (inlet and outlet) | 17.43 | 19.92 | 22.40 | 24.89 | 29.87 | 34.84 |
| Temp.Diff. to Transfer Specified Power (deg. C.) | 418.85 | 418.85 | 418.85 | 418.85 | 418.85 | 418.85 |
| Avg. Element Temp. = Ext. Surf. Temp. to XFR Spec Pwr. (deg. C.) | 436.28 | 438.77 | 441.25 | 443.74 | 448.72 | 453.69 |
| minimum element temperature (deg. C.) | 423.85 | 423.85 | 423.85 | 423.85 | 423.85 | 423.85 |
| maximum element temperature (deg. C.) | 453.71 | 458.68 | 463.66 | 468.63 | 478.59 | 488.54 |
| outlet diss. ozone concentration/inlet diss. ozone concentration | 0.86 | 0.77 | 0.64 | 0.49 | 0.16 | 0.01 |

TABLE 14

Example 6 - Prior Art Design

Prior Art Example for 10.0 L/min flow

| | | | | | | |
|---|---|---|---|---|---|---|
| tubing ID (inches) | 1.5625 | 1.5625 | 1.5625 | 1.5625 | 1.5625 | 1.5625 |
| tubing OD (inches) | 1.75 | 1.75 | 1.75 | 1.75 | 1.75 | 1.75 |
| Inlet Temp T1 deg. C. | 5 | 5 | 5 | 5 | 5 | 5 |
| Outlet Temp T2 deg. C. | 35 | 40 | 45 | 50 | 60 | 70 |
| Req'd Temperature Rise deg. C. | 30 | 35 | 40 | 45 | 55 | 65 |
| Flow Rate L/min | 10 | 10 | 10 | 10 | 10 | 10 |
| Flow Rate ml/sec | 166.7 | 166.7 | 166.7 | 166.7 | 166.7 | 166.7 |
| Req'd Power kW | 20.74 | 24.20 | 27.65 | 31.11 | 38.02 | 44.94 |
| Decay Constant Tau sec for given ozone-water solution temp.T2 | 79.4 | 52.9 | 35.7 | 24.3 | 11.7 | 5.9 |
| tubing ID (inches) | 1.5625 | 1.5625 | 1.5625 | 1.5625 | 1.5625 | 1.5625 |
| tubing OD (inches) | 1.75 | 1.75 | 1.75 | 1.75 | 1.75 | 1.75 |
| tubing wall thickness (inches) | 0.09375 | 0.09375 | 0.09375 | 0.09375 | 0.09375 | 0.09375 |
| tubing ID (cm) | 3.969 | 3.969 | 3.969 | 3.969 | 3.969 | 3.969 |
| tubing OD (cm) | 4.445 | 4.445 | 4.445 | 4.445 | 4.445 | 4.445 |
| tubing wall thickness (cm) | 0.238 | 0.238 | 0.238 | 0.238 | 0.238 | 0.238 |
| length of heated tube (in) scaled for given surf.pwr. density | 62.22 | 72.59 | 82.96 | 93.33 | 114.07 | 134.81 |

TABLE 14-continued

Example 6 - Prior Art Design

Prior Art Example for 10.0 L/min flow

| | | | | | | |
|---|---|---|---|---|---|---|
| length of heated tube (ft) | 5.19 | 6.05 | 6.91 | 7.78 | 9.51 | 11.23 |
| length of heated tube (cm) | 158.0 | 184.4 | 210.7 | 237.1 | 289.7 | 342.4 |
| volume of heated tube (cm3) =ml | 1955.1 | 2281.0 | 2606.8 | 2932.7 | 3584.4 | 4236.1 |
| liquid fluid material being heated | water | water | water | water | water | water |
| fluid inlet temperature (deg. C.) | 5 | 5 | 5 | 5 | 5 | 5 |
| fluid density rho (g/cm3) | 0.9974 | 0.9974 | 0.9974 | 0.9974 | 0.9974 | 0.9974 |
| fluid kinematic viscosity eta (g/cm-sec) | 9.80E−03 | 9.80E−03 | 9.80E−03 | 9.80E−03 | 9.80E−03 | 9.80E−03 |
| flow rate (liters/min) | 10.00 | 10.00 | 10.00 | 10.00 | 10.00 | 10.00 |
| flow rate (ml/sec) | 166.67 | 166.67 | 166.67 | 166.67 | 166.67 | 166.67 |
| tubing flow cross section area (cm2) | 12.371 | 12.371 | 12.371 | 12.371 | 12.371 | 12.371 |
| free stream velocity through tubing (cm/sec) | 13.47 | 13.47 | 13.47 | 13.47 | 13.47 | 13.47 |
| Re = density*free stream vel.*hydraulic.diam/kinem. viscosity | 5442 | 5442 | 5442 | 5442 | 5442 | 5442 |
| nozzle ID friction factor (turbulent flow - FIG. 6.4) | 0.0376 | 0.0376 | 0.0376 | 0.0376 | 0.0376 | 0.0376 |
| pressure drop across tubing (newtons/m2) Pascal | 13.54 | 15.80 | 18.06 | 20.31 | 24.83 | 29.34 |
| pressure drop across tubing (psi) | 0.00 | 0.00 | 0.00 | 0.00 | 0.00 | 0.00 |
| fluid residence time at flow rate (secs) | 11.73 | 13.69 | 15.64 | 17.60 | 21.51 | 25.42 |
| Prandtl No. Pr for water at 20 deg C. = Cp*viscos/k (dimensionless) | 6.78 | 6.78 | 6.78 | 6.78 | 6.78 | 6.78 |
| Nusselt No. Nu = 0.023Re^0.8*Pr^0.4, turbulent flow | 48.17 | 48.17 | 48.17 | 48.17 | 48.17 | 48.17 |
| thermal conductivity of water at 20 deg. C. watt/cm/deg C. | .00604 | .00604 | .00604 | .00604 | .00604 | .00604 |
| heat transfer coefficient watt/cm2/deg. C. | 0.07 | 0.07 | 0.07 | 0.07 | 0.07 | 0.07 |
| normalized film resis. (tube inner wall to water) (deg C./watt/cm2) | 13.640 | 13.640 | 13.640 | 13.640 | 13.640 | 13.640 |
| tube inner surface area (cm2) | 1970.5 | 2298.9 | 2627.4 | 2955.8 | 3612.6 | 4269.5 |
| tube outer surface area (cm2) | 2207.0 | 2574.8 | 2942.7 | 3310.5 | 4046.1 | 4781.8 |
| thermal resistance from water to tube inner surface (deg. C./watt) | .00692 | .00593 | .00519 | .00461 | .00378 | .00319 |
| percent of total thermal resistance - water to tube | 46% | 46% | 46% | 46% | 46% | 46% |
| thickness of tube wall (cm) | 0.238 | 0.238 | 0.238 | 0.238 | 0.238 | 0.238 |
| tubing material | QRTZ | QRTZ | QRTZ | QRTZ | QRTZ | QRTZ |
| tube material thermal conductivity (watt/cm-deg. C.) | 0.014 | 0.014 | 0.014 | 0.014 | 0.014 | 0.014 |
| normalized thermal resis. through the tube wall (deg C./watt/cm2) | 17.01 | 17.01 | 17.01 | 17.01 | 17.01 | 17.01 |
| average area of tube wall (cm2) | 2,089 | 2,437 | 2,785 | 3,133 | 3,829 | 4,526 |
| thermal resistance through the tube wall (deg C./watt) | .00814 | .00698 | .00611 | .00543 | .00444 | .00376 |
| percent of total thermal resistance - tube wall | 54% | 54% | 54% | 54% | 54% | 54% |
| total thermal resistance (deg C./watt) | .01506 | .01291 | .01130 | .01004 | .00822 | .00695 |
| total (normalized to ext. surf.) therm. resist.(deg C./watt/cm2) | 33.25 | 33.25 | 33.25 | 33.25 | 33.25 | 33.25 |
| Transferred Power (watt) | 20741 | 24198 | 27654 | 31111 | 38025 | 44938 |
| Transferred Volume Power Density (watt/cm3) | 11 | 11 | 11 | 11 | 11 | 11 |
| mass flow rate of water (grams/sec) | 166 | 166 | 166 | 166 | 166 | 166 |
| heat capacity of water Joules/gram/deg. C. | 4.179 | 4.179 | 4.179 | 4.179 | 4.179 | 4.179 |
| temperature rise of water from inlet to outlet (deg. C.) | 29.86 | 34.83 | 39.81 | 44.78 | 54.74 | 64.69 |
| Surface Power Density-Tube Exterior Surface (watts/cm2) | 9.40 | 9.40 | 9.40 | 9.40 | 9.40 | 9.40 |
| Surface Power Density - Tube Exterior (watts/in2) | 60.63 | 60.63 | 60.63 | 60.63 | 60.63 | 60.63 |
| Aveage Fluid Temperature (inlet and outlet) | 17.43 | 19.92 | 22.40 | 24.89 | 29.87 | 34.84 |
| Temp.Diff. to Transfer Specified Power (deg. C.) | 312.46 | 312.46 | 312.46 | 312.46 | 312.46 | 312.46 |

TABLE 14-continued

Example 6 - Prior Art Design

Prior Art Example for 10.0 L/min flow

| | | | | | | |
|---|---|---|---|---|---|---|
| Avg. Element Temp. = Ext. Surf. Temp. to XFR Spec Pwr. (deg. C.) | 329.88 | 332.37 | 334.86 | 337.35 | 342.32 | 347.30 |
| minimum element temperature (deg. C.) | 317.46 | 317.46 | 317.46 | 317.46 | 317.46 | 317.46 |
| maximum element temperature (deg. C.) | 347.31 | 352.29 | 357.26 | 362.24 | 372.19 | 382.14 |
| outlet diss. ozone concentration/inlet diss. ozone concentration | 0.86 | 0.77 | 0.64 | 0.49 | 0.16 | 0.01 |

If we examine the inventive examples 1, 2, and 3 and compare them to the prior art design examples 4, 5, and 6 we note that the outlet dissolved ozone concentration divided by the inlet dissolved ozone concentration is higher for the inventive design than for the prior art design and that the difference becomes more marked at higher heater outlet temperatures. We have summarized the results for two outlet temperatures in table 15 below. We can see that the inventive heater design example has the potential to supply a dissolved ozone concentration at the heater outlet at a temperature of 40 degree C. is 27 percent higher than the prior art design; the inventive heater design example has the potential to supply a dissolved ozone concentration at the heater outlet at a temperature of 70 degree C. which is a factor of 11 higher than the prior art design. This translates directly into performance improvements in systems employing the inventive heater to heat relatively low temperature ozone-water solutions (more generally ozone-solvent solutions) to higher temperatures to increase the surface reaction rate while maintaining high dissolved ozone concentrations. Comparable differences between the inventive design and prior art designs are exhibited by the other inventive and prior art design examples presented.

TABLE 15

Heater Performance Comparison

| Design | Prior Art Design Example 4 | | Inventive Design Example 1 | |
|---|---|---|---|---|
| Ozone-Solvent Soln. Temp. T1 @ htr. inlet ° C. | 5 | 5 | 5 | 5 |
| Ozone-Solvent Soln. Temp. T2 @ htr. oulet ° C. | 40 | 70 | 40 | 70 |
| Outlet Diss. O3 Conc./Inlet Diss. O3 Conc. | .77 | .06 | .98 | .67 |

We can identify a number of important differences between the inventive design and the prior art design examples. First, the inventive heater design examples have a much higher transferred volume power density than the prior art design examples (~112 watts/cm3 compared to 11 watts/cm3). Second, the inventive heater design examples have a much higher internal surface area to internal volume ratio than the prior art design examples (5 cm−1 compared to 1 cm−1). This is summarized in the table 16 below.

TABLE 16

Heater Design Comparison

| | Prior Art Design | | Inventive Design | |
|---|---|---|---|---|
| Design | Example 4 | Example 6 | Example 1 | Example 3 |
| Transferred Power Density (watts/cm3) | 11 | 11 | 112 | 115 |
| Internal Surface Area/ Internal Volume (cm-1) | 1.0 | 1.0 | 8.76 | 5.0 |

An inventive design with a transferred power density of as low as 50 watts/cm3 will have a significant performance advantage over the prior art design examples shown, albeit not quite as dramatic as the inventive design examples shown. An inventive design with a surface to volume ratio as low at 2.5 cm−1 will have a significant performance advantage over the prior art design examples shown, albeit not quite as dramatic as the inventive design examples shown.

The much higher transferred volume power density translates to a much shorter residence time for a given transferred power and the much higher surface to volume ratio translates to lower thermal resistances between the liquid and the interior wall for a given flow rate and lower required exterior surface temperatures. Third, the inventive design examples use smaller diameter heater tubes which can be constructed from thinner walls for a given operating pressure. This translates into lower thermal resistance between the interior wall and the exterior wall and lower required exterior surface temperatures. Additional differences between the inventive design examples and the prior art design examples can be noted by comparing the values for the other parameters shown in the design examples.

The design examples shown above are representative of resistance heated or induction heated designs and other designs in which power is transferred to a liquid flowing through a conduit by heating the exterior wall of the conduit. These design examples are also representative of many of the key features of heat exchanger inventive designs except the heat source is the heated working fluid flowing over the exterior surface of the conduit in lieu of a heating element and the thermal resistance comprises the resistance from the process water to the tube wall, the thermal resistance of the tube wall, and the thermal resistance from the tube wall to the working fluid. The inventive heat exchanger designs derive the same benefits from higher transferred power densities, higher surface to volume ratios, and smaller tube (conduit) diameters and exhibit similar advantages in performance over prior art designs except that the inventive heat exchanger designs with a multiple tube in tube geometry, for use with tube materials with low thermal conductivity such as Teflon, have surface to volume ratios which are at least a factor of two higher than the inventive resistance heated and induction heated designs.

It should be noted that one can use similar approaches to increase the surface to volume ratio for resistance heated and induction heated designs which employ low thermal conductivity materials such as Teflon. These designs may employ an analog to the multiple tube-in-tube heat exchanger design; such a design may employ, for example, seven small diameter Teflon coated heating elements inside a tube carrying the solution to be heated. Other numbers of heating elements could be used, of course, but seven provides for a convenient close packed type structure, with six elements spaced somewhat apart and surrounding an inner heating element, all surrounded by the outer tube.

The inventive heat exchanger designs have comparable transferred power densities to those of the direct heater designs of the resistance heated or induction heated type.

The inventive designs in which the flowing ozone-solvent solution is heated by microwave radiation, infrared radiation, or heated fluid injection derive the same benefit from a higher transferred power density as the other inventive designs presented herein and use similar maximum volumes and dimensions and are based upon the distinguishing design principles identified above. In the case of some of these designs one may achieve even higher transferred volume power densities. However, in these latter inventive designs, the power is not transferred by heat conduction through the conduit wall and from the wall through the flowing liquid boundary. In the microwave or infrared heated design the energy is transferred by radiation through the tube wall. In the heated fluid injection design using steam injection the energy is transferred when the injected steam releases its energy when it condenses. Accordingly the a high surface to volume ratio is not a critical element of these latter designs. The designer may choose a convenient surface to volume ratio provided that the geometry provides the high transferred power density and other desired characteristics such as an acceptable flow induced pressure drop. In a single tube or multiple tube geometry, the use of a small tube diameter for high transferred volume power density will also result in a relatively high surface to volume ratio.

The point-of-use heater is designed to have a small residence volume so that the residence time between the cool ozone-water solution entering the inlet of the heater and heated, supersaturated, ozone-water solution reaches the point of application is small and there is insufficient time for supersaturated solution to return to equilibrium before reaching the surface of the material to be oxidized. The time required for the solution to return to equilibrium is dependent upon the temperature to which to solution is heated. Our preliminary measurements indicate that at a temperature of about 50 degree C., a residence time of 2 seconds will allow the dissolved concentration to only fall by about 10 to 20 percent. At higher temperatures, the required residence time is smaller. The residence time is proportional to the volume and inversely proportional to the dispense flow rate though that volume.

In collecting the data on the rate of decay of an ozone-water solution as a function of the temperature of the ozone water solution, we prepared an ozone-water solution by dissolving ozone gas, at concentration of 240 g/Nm3, a flow rate of 0.48 L/min, and a pressure of 1 bar, into water at a temperature of about 8 degree C. using a Mazzei Model 287 venturi injector and bubble column contactor operated in the recirculating mode. We waited about 30 minutes and allowed the dissolved concentration to reach the saturation concentration at about 70. We drew the ozone-water solution from the unpressurized contactor with a high pressure gear pump capable of delivering a flow rate of 2.7 L/minute at 80 psi. We passed the solution through an Exergy tube in tube heat exchanger model 413, through a UV absorption type dissolved ozone monitor and thermocouple probe, and then to a waste collection carboy. We measured the dissolved concentration upstream and downstream of the heater as a function of the temperature of the ozone-water solution downstream of the heater for several different temperatures. We used this data to estimate the decay time constant as function of temperature by assuming that the decay time was an exponential function of the temperature. We ran a similar test using coil in heated water bath heater. We flowed the water through a 20 foot long coil of stainless steel, 0.375 inch OD, 0.305 inch ID tubing, immersed in a heated water bath. Since the water bath did not have sufficient power to maintain a constant bath temperature, the dispense temperature of the ozone water solution decreased about 5 degree C. during the test. Accordingly, we used average temperatures in analyzing the results. The residence volume of the coil in bath heater was about 270 ml and the residence volume of the tube in tube heat exchanger was about 90 ml. (see the table 3 footnotes) The results for both tests were consistent with the model presented below. The results for one test series are presented in Table 17 below.

TABLE 17

Decay time constant as a function of temperature: Measured decay time constant as function of temperature and calculated decay time constant τ(Tau) as function of temperature assuming that the decay time is an exponential function of the temperature $\tau = 2E-10 * Exp(8.26(1000/T))$

| Temp deg. C. | Temp. deg. K. | 1000/T (K) | meas. decay const. τ secs | calc. decay const. τ secs | transit time t secs note 1 | decay factor $\exp(-t/\tau)$ | transit time t secs note 2 | decay factor $\exp(-t/\tau)$ | transit time t secs note 3 | decay factor $\exp(-t/\tau)$ |
|---|---|---|---|---|---|---|---|---|---|---|
| 20 | 293 | 3.41 | | 292.3 | 2 | 99% | 6 | 98% | 22 | 93% |
| 25 | 298 | 3.36 | | 186.6 | 2 | 99% | 6 | 97% | 22 | 89% |
| 30 | 303 | 3.30 | | 120.9 | 2 | 98% | 6 | 95% | 22 | 83% |
| 35 | 308 | 3.25 | | 79.4 | 2 | 98% | 6 | 93% | 22 | 76% |
| 40 | 313 | 3.19 | | 52.9 | 2 | 96% | 6 | 89% | 22 | 66% |
| 45 | 318 | 3.14 | | 35.7 | 2 | 95% | 6 | 85% | 22 | 54% |

TABLE 17-continued

Decay time constant as a function of temperature: Measured decay time constant as function of temperature and calculated decay time constant τ(Tau) as function of temperature assuming that the decay time is an exponential function of the temperature $$\tau = 2E-10*Exp(8.26(1000/T))$$

| Temp deg. C. | Temp. deg. K. | 1000/T (K) | meas. decay const. τ secs | calc. decay const. τ secs | transit time t secs note 1 | decay factor exp(-t/τ) | transit time t secs note 2 | decay factor exp(-t/τ) | transit time t secs note 3 | decay factor exp(-t/τ) |
|---|---|---|---|---|---|---|---|---|---|---|
| 50 | 323 | 3.10 |  | 24.3 | 2 | 92% | 6 | 78% | 22 | 41% |
| 55 | 328 | 3.05 |  | 16.8 | 2 | 89% | 6 | 70% | 22 | 27% |
| 60 | 333 | 3.00 | 11.00 | 11.7 | 2 | 84% | 6 | 60% | 22 | 15% |
| 65 | 338 | 2.96 | 8.4 | 8.3 | 2 | 79% | 6 | 49% | 22 | 7% |
| 70 | 343 | 2.92 |  | 5.9 | 2 | 71% | 6 | 36% | 22 | 2% |
| 75 | 348 | 2.87 | 4.05 | 4.3 | 2 | 63% | 6 | 24% | 22 | 1% |
| 80 | 353 | 2.83 |  | 3.1 | 2 | 52% | 6 | 14% | 22 | 0% |
| 85 | 358 | 2.79 |  | 2.3 | 2 | 41% | 6 | 7% | 22 | 0% |
| 90 | 363 | 2.75 |  | 1.7 | 2 | 30% | 6 | 3% | 22 | 0% |
| 95 | 368 | 2.72 |  | 1.3 | 2 | 20% | 6 | 1% | 22 | 0% | note 1:
Exergy Model 413 stainless steel tube-in-tube heat exchanger; total residence volume from the heater inlet to the heater outlet approximately 90 ml; dispense flow rate 45 ml/sec; residencetimeapproximately2secs
note 2:
⅜ inch OD, 20 foot long, coil in water bath heater; total residence volume from the heater inlet to the heater outlet approximately 270 ml; dispense flow rate approx. 45 ml/sec; residencetimeapproximately6secs
note 3:
relatively large volume heater or heat exchanger; total residence volume from the heater inlet to the heater outlet chosen to be 1000 ml; dispense flow rate approx. 45 ml/sec; residencetimeapproximately22secs From this data we can see that higher temperatures cause the concentration to fall more quickly. If one is to minimize the drop in concentration upon heating, then the residence time must be decreased if the temperature is increased. For example, if we would like the dissolved ozone concentration at the outlet of the point-of-use heater to be no less than 80 percent of the dissolved ozone concentration at the inlet of the point-of-use heater, then the transit time must be less than or equal to the values estimated in Table 18 below.

TABLE 18

Maximum estimated permissible ozone-water solution heating time (heater transit time): Calculated for the dissolved ozone concentration at the heater outlet to be no less than 80 percent of the dissolved ozone concentration at the heater inlet. Estimated from decay data measured with an inlet dissolved ozone concentration of about 100 mg/liter, an initial upstream ozone-water solution temperature of about 8 deg. C. and the a final specified downstream ozone-water solution temperature ranging from 20 deg. C. to 95 deg. C.

| | | | Desired Decay Factor = 80% (Downstream Conc./Upstream Conc.) | |
|---|---|---|---|---|
| Ave solution temp. at heater outlet Temp deg. C. | Temp. deg. K | 1000/T (K) | Estimated decay const. Tau τ secs | Calculated maximum allowable heater transit time t = -τ*Ln(decay factor) secs |
| 20 | 293 | 3.41 | 292.3 | 65.22 |
| 25 | 298 | 3.36 | 186.6 | 41.63 |
| 30 | 303 | 3.30 | 120.9 | 26.97 |
| 35 | 308 | 3.25 | 79.4 | 17.72 |
| 40 | 313 | 3.19 | 52.9 | 11.80 |
| 45 | 318 | 3.14 | 35.7 | 7.96 |
| 50 | 323 | 3.10 | 24.3 | 5.43 |
| 55 | 328 | 3.05 | 16.8 | 3.75 |
| 60 | 333 | 3.00 | 11.7 | 2.62 |
| 65 | 338 | 2.96 | 8.3 | 1.85 |
| 70 | 343 | 2.92 | 5.9 | 1.32 |
| 75 | 348 | 2.87 | 4.3 | 0.95 |
| 80 | 353 | 2.83 | 3.1 | 0.69 |
| 85 | 358 | 2.79 | 2.3 | 0.51 |
| 90 | 363 | 2.75 | 1.7 | 0.37 |
| 95 | 368 | 2.72 | 1.3 | 0.28 |

If we return to the design examples shown above, we see that another important difference between the new design shown under examples 2, 3, and 4 and the conventional design that is the new design has an internal volume of 50 to 100 ml whereas the conventional design has an internal volume of 848 ml. At a flow rate of 2.65 L/min ~45 ml per second, an internal volume of 100 ml corresponds to a residence time of 2.26 seconds and an internal volume of 848 ml corresponds to a residence time of 19.2 seconds. This longer residence time impacts the decay of the ozone concentration as illustrated in Table 18 above.

Factors Determining Oxidation Rate or Removal Rate—A Model

The inventors have developed a model to help better understand the factors determining oxidation and removal rate of an organic material such as photoresist from a semiconductor wafer using an ozone-solvent solution at concentration C and temperature T. The rate of oxidation and removal of an organic layer from a substrate can be defined in terms of an each rate can write an expression for the etch rate E (cm resist/sec) as $E=C*(X/\rho)*(M*S)/(M+S)$. The parameter C (g ozone/cm3) is the dissolved ozone the water far from the surface of the organic layer on a semiconductor wafer bulk concentration). The parameter X (g resist/g Ozone) is the mass of resist removed per mass of ozone consumed at the surface. The parameter p (g resist/cm3) is the density of the resist.

Dissolved Ozone Concentration C: When ozone is dissolved in a solvent, the maximum dissolved ozone concentration C that can be achieved after a sufficiently long transfer time, the saturation concentration, is predicted by Henry's law. According to Henry's law, the maximum solubility is proportional to the partial pressure of the ozone gas at a given temperature. Higher gas phase concentrations, high pressures, and lower solvent temperatures yield higher maximum equilibrium dissolved ozone concentrations.

We have calculated the approximate equilibrium saturation concentration in mg/L (equivalent to parts per million by weight) for a gas phase concentration of 240 mg/L (15.9 weight percent), pressures of 1, 2, and 4 bar, and water (solvent) temperatures of 5 to 95 degree C. in 5 deg. C increments. See Table A.

TABLE A

Solubility of ozone gas in water: The dissolved ozone concentration in mg/L as a function of the water temperature and gas pressure for a gas phase ozone concentration of 240 g/Nm3 = mg/liter (15.9 weight percent) in oxygen for a range of water temperatures.

|  | p = 1 bar (14.5 psia) | p = 2 bar (29 psia) | p = 4 bar (58 psia) |
| --- | --- | --- | --- |
| 5 deg. C. | 109 | 218 | 436 |
| 10 deg. C. | 85 | 170 | 340 |
| 15 deg. C. | 66 | 132 | 264 |
| 20 deg. C. | 52 | 104 | 208 |
| 25 deg. C. | 40 | 80 | 160 |
| 30 deg. C. | 31 | 62 | 124 |
| 40 deg. C. | 24 | 48 | 96 |
| 45 deg. C. | 19 | 38 | 76 |
| 50 deg. C. | 15 | 30 | 60 |
| 55 deg. C. | 11 | 22 | 44 |
| 60 deg. C. | 9 | 18 | 36 |
| 65 deg. C. | 7 | 14 | 28 |
| 70 deg. C. | 5 | 10 | 20 |
| 75 deg. C. | 4 | 8 | 16 |
| 80 deg. C. | 3 | 6 | 12 |
| 85 deg. C. | 2.5 | 5 | 10 |
| 90 deg. C. | 1.2 | 2.4 | 4.8 |
| 95 deg. C. | .9 | 1.8 | 3.6 |

Mass Transport Rate Coefficient M: The parameter M (cm/sec) is the liquid phase mass transport rate coefficient. The ozone is transported to the wafer surface by diffusion. The mass transport rate $M (cm/sec)=D/\delta$, where D (cm2/sec) is the diffusion constant of the ozone diffusing in the liquid and $\delta$ (cm) is the thickness of the stagnant layer. The diffusion constant D for ozone in water is 1.7E-5 cm2/sec at 20 deg. C. Accordingly the mass transport rate is increased when the diffusion constant is increased and/or the diffusion distance $\delta$ is decreased.

Surface Reaction Rate Constant S: The parameter S (cm/sec) is the temperature dependent surface reaction rate constant. The surface reaction rate S (cm/sec) is an exponential function of the absolute temperature T (deg. K) and the activation energy Ea of the oxidation process. In particular, $S=Soexp(-Ea/KT)$ where K is Boltzman's constant and So is the surface reaction rate proportionality constant. The difference in etch rates of different materials at a given temperature is attributed to the difference in the magnitude of the surface reaction rate constant for the two materials.

Etching Wafers at High Temperature: An increase in temperature will increase S and the magnitude of the term $(M*S)/(M+S)$. If the dissolved concentration remained approximately constant with an increase in temperature, then we can see that the etch rate would increase with increased temperature. However, as we have seen, the dissolved ozone concentration falls with increases in water temperature. If the temperature is such that S>>M, the etch rate becomes mass transport limited and $E=C(X/\rho)*M$. If M is larger, then the temperature at which the etch rate becomes limited by the mass transport rate M will be higher. If the temperature is higher, then the mass transport rate at which the etch rate will become mass transport limited will be higher.

Etching Wafers at Low Temperature: A decrease in temperature will decrease S and the magnitude of the term $(M*S)/(M+S)$. If the dissolved concentration remained approximately constant with decreases in temperature, then we can see that the etch rate would decrease with a decrease in temperature. However, as we have seen, the dissolved ozone concentration rises with decreases in water temperature. If the temperature is decreased until S<<M, the etch rate becomes surface reaction rate limited and $E=C(X/\rho)*S$.

An Approach to Achieving Very High Etch Rates: This model can provide us valuable insight into the problem. It shows that the normalized etch rate be increased by increasing the temperature and that the etch rate could be increased by increasing the temperature above 20 degree C. if we could find a method to provide a higher dissolved concentration at the elevated temperature. The present preferred embodiments utilize just such a method.

The general principal is to achieve the highest dissolved ozone concentration at a given surface reaction temperature. This can be done in a number of ways including the following:

a) heat the cold ozone-solvent solution with an in-line heater located just upstream of the point at which the ozone-solvent solution is dispensed onto the substrate. The heated ozone-solvent solution will then heat the surface of the substrate and increase the surface reaction rate. The ozone-solvent solution will retain most of the ozone dissolved at the lower temperature if the solution is not heated until the last moment.

b) heat the cold ozone-solvent solution at the point of application with a point of application heater as the solution passes over the substrate surface by for example using a radiant heater with the wavelength band chosen to be absorbed by the ozone-solvent solution. The heated ozone-solvent solution will then heat the surface of the substrate and increase the surface reaction rate.

c) heat the substrate with a point of application heater and dispense the cold ozone-solvent solution onto the surface of the heated substrate. Provide sufficient heat input to the substrate to overcome cooling effect of the cold solvent. In practice the substrate can be heated from the backside or from the front side. If the substrate is heated from the backside, the entire volume of the substrate may be heated so that the front surface, the surface to be etched, can be heated. If the substrate is heated from the front side, the entire volume of the substrate may be heated or only the front surface may be heated. The surface reaction rate at the front surface is a function of the temperature of the front surface.

d) heat the cold ozone-solvent solution and heat the substrate by for example using a radiant heater with the wavelength band chosen to be absorbed partially by the ozone-solvent solution and partially by the substrate.

The substrate surface can be heated by conduction, convection, or radiation. The surface can be heated by conduction using a heated surface such as a hot plate. The surface can be heated by convection using a hot gas or hot liquid to the front or rear surface. The substrate can be heated by radiation using a heat lamp or laser or other source of radiation. The radiation wavelength band can be chosen so that the radiation passes through the ozone-water solution with little energy deposition in the water and the majority of the energy absorbed in the surface. In fact the radiation can be chosen to be most strongly absorbed in the layer to removed (photoresist for example).

Teflon Heat Exchanger Design Calculation

Requirement: A heat exchanger with all Teflon PFA or Teflon PTFE wetted parts and a minimum internal volume (not to exceed 150 to 300 ml) and a tube flow rate of 1.65 to 3.3 Liter/minute. See Table 19.

TABLE 19

Teflon Exchanger Performance Requirement

| | Inner Tubes | Outer Tube (shell) |
|---|---|---|
| Fluid Type | water | water |
| Temp In ° C. | 5 | 90 |
| Temp Out ° C. | 55 | TBD |
| Total Volume Flow | 2.0 L/min (1.65 to 3.3) | TBD |
| Pressure Drop | TBD (not to exceed 40 psi) | TBD (not to exceed 60 psi) |
| Heat Transfer | | 6.9 kW for 2.0 L/min |
| Effectiveness | | TBD |
| Heat Transfer Coeff. (W/m2 ° C.) | | TBD |

Design Approach: Since the thermal conductivity of Teflon is much lower than stainless steel (0.22 compared to 16.3 watts/m2 deg. K) the heat transfer area must be made larger by about a factor of 3 to 6. The Tube in Tube design is one approach. However, if we increase the length to 60 feet for a 0.25-inch OD inner tube design, the pressure drop increases to a very high value. An alternative approach is a hybrid between the 20-foot long tube in tube design and a 7-tube shell and tube design. In this case we can increase the heat transfer area by almost a factor of 3 for a given length. Since the Teflon is quite flexible this shell & tube exchanger can be coiled in much the same manner as a tube in tube. A rough initial design is outlined in Table 20 below. The length and number of tubes should be adjusted to meet the requirement. The Teflon inner tubes can be connected at the inlet with a flare fitting approach at the exchanger end plates or by heat welding the Teflon inner tubes to Teflon End Plates.

TABLE 20

Initial Design Parameters for a Proprietary Custom Shell &Tube Heat Exchanger with Teflon Inner Tubes Design: SHELL & TUBE

| | |
|---|---|
| outer tube (shell) material | Teflon PFA or 316 Stainless Steel |
| inner tube material | Teflon PFA |
| PFA tubing surface roughness | 1.7 RA (source Fluroware) |
| PFA thermal Conductivity | 0.22 W/m2 deg. K |
| outer tube (shell) OD | 0.5 inches |
| outer tube (shell) ID | 0.440 inches or 0.375 inches |
| outer tube (shell) length | = inner tube length |
| inner tube OD | 0.092 inches (similar dimension to an Exergy 10 series shell and tube) |
| inner tube wall thickness | 0.008 inches |
| inner tube length | ~240 inches (TBD) |
| number of inner tubes | 7 |
| heat transfer area | (3120 cm2) |
| inner tube volume | (140 ml) |
| out tube (shell) pressure drop at 2 L/min | ~60 psi (TBD) |
| inner tube pressure drop @ 2 L/min | ~10 psi (TBD) |

TABLE 21

Example design parameters and calculated performance for different process (inner tube) flow rates

| Process Flow Rate | 1.65 L/min | 2.0 L/min | 2.7 L/min | 3.3 L/min |
|---|---|---|---|---|
| outer tube material | Teflon PFA or 316 SS | Teflon PFA or 316 SS | Teflon PFA or 316 SS | Teflon PFA or 316 SS |
| inner tubes material | Teflon PTFE or PFA | Teflon PTFE or PFA | Teflon PTFE or PFA | Teflon PTFE or PFA |
| PFA tubing surface roughness | ~1.7 RA | ~1.7 RA | ~1.7 RA | ~1.7 RA |
| PFA thermal Conductivity (W/m2 deg. K) | 0.22 | 0.22 | 0.22 | 0.22 |
| outer tube (shell) OD (inches) | 0.5 | 0.5 | 0.5 | 0.5 |
| outer tube (shell) ID (inches) | 0.430 | 0.430 | 0.430 | 0.430 |
| outer tube (shell) length | inner tube length | inner tube length | inner tube length | inner tube length |

TABLE 21-continued

Example design parameters and calculated performance for different process (inner tube) flow rates

| Process Flow Rate | 1.65 L/min | 2.0 L/min | 2.7 L/min | 3.3 L/min |
|---|---|---|---|---|
| inner tube OD (inches) | 0.092 | 0.092 | 0.092 | 0.092 |
| inner tube wall thickness (inches) | 0.008 | 0.008 | 0.008 | 0.008 |
| number of inner tubes | 7 | 7 | 7 | 7 |
| inner tube length (inches) | 150 | 150 | 150 | 150 |
| inner tube volume (ml) | 82.2 | 82.2 | 82.2 | 82.2 |
| available heat transfer area (cm2) | 1832 | 1832 | 1832 | 1832 |
| assumed effective heat transfer area (cm2) = see note 1 | 1374 | 1374 | 1374 | 1374 |
| inner tubes fluid type | water | water | water | water |
| inner tubes temp. in (deg. C.) | 5 | 5 | 5 | 5 |
| inner tubes temp out (deg. C.) | 63.8 | 57.9 | 48.7 | 42.9 |
| inner tubes volume flow l/min | 1.65 | 2.0 | 2.7 | 3.3 |
| inner tubes mass flow g/sec | 27.3 | 33.1 | 44.7 | 54.6 |
| inner tubes pressure drop (psi) | 12.5 | 17.5 | 29.5 | 41.9 |
| outer tube fluid type | water | water | water | water |
| outer tube temp. in (deg. C.) | 90 | 90 | 90 | 90 |
| outer tube temp out (deg. C.) | 83.4 | 82.8 | 82 | 81.5 |
| outer tube volume flow l/min | 14.9 | 14.9 | 14.9 | 14.9 |
| outer tube mass flow g/sec | 242.9 | 242.9 | 242.9 | 242.9 |
| outer tube pressure drop (psi) | 45.1 | 45.1 | 45.1 | 45.1 |
| inner tube thermal conductivity (watts/deg. k) | 5281 | 6690 | | 4647? |
| tube wall thermal conductivity (watts/deg. k) | 171 | 171 | 171 | 171 |
| outer tube thermal conductivity (watts/deg. k) | 938 | 938 | 938 | 938 |
| inner tube thermal resistance (deg. k/watt) | .00019 | .00015 | | |
| tube wall thermal resistance (deg. k/watt) | .0058 | .0058 | .0058 | .0058 |
| outer tube thermal resistance (deg. k/watt) | .0011 | .0011 | .0011 | .0011 |
| total total thermal resistance (deg. k/watt) | .0071 | .0071 | | |
| Heat Transfer (Btu/hr) | 22903 | 21830 | 27842 | 29527 |
| Heat Transfer (watts) | 6712 | 6398 | 8160 | 8653 |
| Effectiveness | .691 | .659 | .514 | .446 |

Note 1:
calculation of performance made using a modified tube in tube heat exchanger model; model assumes the effective heat transfer area is 0.75 of total area because flexible Teflon tubes may touch at various points.

Key Design Elements:—Direct Conduction Heated and Heat Exchanger Designs

The Key Elements: Direct Conduction Heated Designs 1. a heater based upon a small diameter tube has a higher surface area for a given volume
2. a higher surface area decreases the thermal resistance between the heated surface of the tube and the water in thermal contact with the other surface of the tube
3. a lower thermal resistance decreases the temperature difference required to transfer given amount of power from the heated surface of the tube to the flowing water in thermal contact with the other surface of the tube
4. a heater requiring a lower temperature difference between the heated surface of the tube and the water in thermal contact with the other surface of the tube requires a lower heated surface temperature for a given inlet and outlet water temperature.

5. a heater based upon a small diameter tube has a smaller volume for a given surface area and therefore a smaller residence time for a given flow rate and given transferred power
6. a heater based upon a small diameter tube of a given burst pressure rating may have a thinner wall than a larger diameter tube of the same burst pressure rating and correspondingly lower thermal resistance through the tube wall
7. a heater based upon a small diameter tube has a higher reynolds number for a given flow rate and correspondingly lower thermal resistance between the water and the adjacent tube wall, i.e. the film resistance is lower
8. a heater based upon a small diameter tube has a smaller internal volume and higher volume power density for a given power transferred (eg. 100 watts/cm3) than a conventional heater which has a volume power density of the order of 10 watts/cm3
9. a heater based upon multiple small diameter tubes with a given total cross sectional area has a higher surface area for a given volume than a heater based upon a single small diameter tube with the same cross sectional area; such a heater will have a lower thermal resistance and is a preferred geometry for tube materials of low thermal conductivity.

The Key Elements: Heat Exchanger Designs 1. same as items 1–9 of the previous list except the heat source is the heated working fluid in lieu of a heating element and the thermal resistance comprises the resistance from the process water to the tube wall, the thermal resistance of the tube wall, and the thermal resistance from the tube wall to the working fluid.

Steam Heater Design Calculation

Process fluid heating using steam injection into an Eductor—Technical Approach

The use of steam heaters for heating of liquids is well known to those skilled in the art. Stream jet heaters optimize the condensing of steam into liquids to provide efficient fluid heating. Steam jet heaters have an inlet (sometimes called the motive flow inlet, the suction inlet, and outlet. The process fluid in enters the motive flow inlet under pressure and travels through the nozzle into the suction chamber. The nozzle coverts the pressure of the process fluid entering the motive flow inlet into a high velocity stream. The increase in velocity lowers the pressure according to Bernolli's law. The steam which enters the suction inlet is mixed with the process fluid. The steam condenses and releases its heat of condensation into the process fluid and thereby heats the process fluid. If the pressure at the outlet is increased above a critical pressure, then the pressure at the "suction inlet" can rise above atmospheric pressure. In this case, the steam must be introduced under pressure into the inlet.

The use of steam heaters for heating liquids has an additional advantage when used for quickly heating a supersaturated ozone-solvent solution. These heaters have a very small residence volume. Accordingly, they can quickly increase the temperature of a flowing ozone-solvent solution. A typical design is shown in Table 22 below.

TABLE 22

| Typical design parameters for a steam heater design using an eductor or ejector | |
|---|---|
| Process Fluid Motive Flow Rate (L/min) | 2.7 |
| Motive Pressure | 50 psig |
| Motive Liquid | Water (with ozone gas dissolved) |
| Motive Liquid Temperature (deg. C.) | 5 |
| Motive Liquid Specific Gravity | 1.0 |
| Flow Rate into "Suction" port | 0.5 lbs/min = .227 kgm/min |
| Fluid into "Suction" port | Saturated Steam (formed form ultra-pure Distilled Water) |
| Fluid Pressure into "Suction" port | 25 psig. |
| Outlet Pressure (psig) | up to 50 psig. maximum |
| Temperature Rise of Motive Liquid (deg. C.) | 45 |
| Temperature of Process Fluid at Outlet (deg. C.) | 50 |
| Eductor Make-Model-Size | Penberthy Model HLM ½", (cf = 0.047) |

In most conventional applications, the eductor or ejector is metal. In this application, where metal contamination must be avoided, the eductor or ejector may be fabricated with an alternative material which is compatible with the process fluid and injected heated fluid (steam in this case) over the range of operating temperatures and pressures and does not introduce undesirable contaminants into the process fluid. Suitable materials in high purity applications include, but are not limited to, quartz and Teflon and Kynar (PVDF).

An alternative design for heating the process fluid with steam is to use a static mixer in lieu of an eductor or ejector. Static mixers are readily available in both metal and quartz.

The description of the preferred embodiments for apparatus for quickly heating a flowing ozone-solvent solution is divided into four groups of figures:

1st GROUP: Direct Conduction Heater Designs (FIG. 1 & FIG. 2)
2$^{nd}$ GROUP: Heat Exchanger Designs (FIG. 3 & FIG. 4)
3$^{rd}$ GROUP: Direct Microwave Heater Designs (FIG. 5)
4th GROUP: Direct Infrared Heater Designs (FIG. 6)
5th GROUP: Heated Fluid Injection Designs (FIG. 7)
6$^{th}$ GROUP: Long Heater Design Geometry (FIG. 8 and FIG. 9)

FIGS. 1–9 are not drawn to scale. With reference to FIGS. 1–9, the tube or conduit(s) which carries the process fluid or are contacted by the process fluid, may be made from any material which is compatible with the process fluid over the range of operating temperatures and pressures and does not introduce undesirable contaminants into the process fluid. Suitable materials in high purity applications include, but are not limited to, quartz, Teflon, stainless steel, and titanium. In some applications it is desirable to exclude metals from the wetted materials. In these cases materials such as quartz and Teflon are preferred materials of construction. In some applications in which heating elements are deposited on the exterior surface of the wetted materials, insulating materials or metal materials covered by an insulating film are preferred. Let us now continue our discussion of inventive heater designs. It should be understood that the design discussions and quantitative data present earlier are still relevant to the inventive designs. The supplement the design examples sketched in FIGS. 1 through 9 and provide the basis of a number of designs summarized in table form above. We do not provide figures of all the embodiments mentioned in table summary form, but only show one or two examples to illustrate the family of designs that are contemplated in this specification. In all the designs presented here, the liquid is conveyed to and from the heater with suitable sections of process compatible tubing or conduit (not shown). The inlet and outlet of the heater are connected to the tubing with suitable flare type, compression, or other fittings. The length and inside diameter of the tubing from the heater outlet to the point of use is chosen to have a small volume since any added volume increases the effective residence volume through which the heated solution must flow from the point of heating to the point of use. This residence volume determines the residence time and the ratio of the outlet dissolved ozone concentration to the inlet dissolved ozone concentration as discussed earlier.

1st GROUP: Direct Conduction Heater Designs (FIG. 1 & FIG. 2)

An apparatus for quickly heating a flowing ozone-solvent solution temperature from a relatively low temperature T1 to a relatively high temperature T2 using a direct conduction heater. A number of embodiments are described above and two are illustrated in FIG. 1 and FIG. 2.

FIG. 1a—Single Tube Solution-Heater with Resistance Heated Elements on Outside of Tube—Longitudinal Heating Element(s).

Description and Operation FIG. 1a

With reference to Fig 1a, a heating element 22 is formed on the exterior surface of a quartz tube 24. The heating element may be deposited in a serpentine pattern over the exterior surface of the tube as shown in FIG. 1a. A suitable electrical connection pad can be provided at each end of the heater element. One connection pad 26 is visible in the figure and the other connection pad is hidden from view. In some cases it may be desirable to form more than one heating element on the surface of the heater. A relatively low temperature ozone-water solution, ozone-solvent solution, or other liquid flows into inlet 28 of the quartz heater tube at a given flow rate and then exits from the outlet 30 at the higher temperature. The flow direction for the fluid entering and leaving the heater is shown by the flow arrows 32 and 34. A temperature sensor and controller (not shown) detects the outlet liquid temperature and controls the application of power to the leads of the heater. The controller compares the actual temperature to the setpoint and controls power to the heater to bring the temperature of the flowing liquid at the outlet to the setpoint temperature. The liquid is conveyed to and from the heater with suitable sections of process compatible tubing or conduit (not shown). The inlet and outlet of the heater are connected to the tubing with suitable flare type, compression, or other fittings. The length and inside diameter of the tubing from the heater outlet to the point of use is chosen to have a small volume since any added volume increases the effective residence volume through which the heated solution must flow from the point of heating to the point of use. This residence volume determines the residence time as discussed earlier. It is often desirable to fabricate multiple heaters using relatively short sections of tubing (12 to 36 inches for example) and then joining those sections together in series or in parallel with Teflon compression tube fittings, or other suitable fittings, to form heaters with higher power capacity. A series connection of three sections is shown in FIG. 8 that follows later in this discussion. The heat power supply may be single phase or three phase. In many high power applications, three phase power is convenient. If each heater has only one heating element, then a heater system assembled comprising three heated tubing sections or multiples of three sections can be conveniently connected to a three phase power source and present a balanced load.

With reference to FIG. 1a, a first method of forming the heating element is to utilize a foil electric heating circuit that is placed directly in thermal contact with the surface of the tubular or other shaped conduit that carries the process fluid to be heated. The foil circuit may be formed by etching, die punching, cutting, or similarly known processes. Such foil electric circuits are known in the heater industry.

With reference to FIG. 1a, a second method of forming the heating element is to use a thick film deposition material such as electrically conductive or resistive inks or pastes or epoxies which may be screen printed, dispensed, or painted directly onto the surface of the tube other shaped conduit that carries the process fluid to be heated. Such thick film pastes or inks are supplied by a number of companies including Electro-Science Laboratories.

With reference to FIG. 1, a third method of forming the heating element is to from a thin film heating element by a thin film deposition process such as sputtering, chemical vapor deposition, vacuum evaporation, or other thin film deposition process FIG. 1b—Single Tube Solution-Heater with Resistance Heated Elements on Outside of Tube-Spiral Heating Element(s).

Description and Operation FIG. 1b

With reference to Fig 1b, a heating element 36 is formed on the exterior surface of a quartz tube 38. The heating element may be deposited in a spiral over the exterior surface of the tube as shown in FIG. 1b. A suitable electrical connection pad can be provided at each end of the heater element. One connection pad 40 is at one end of the tube and the other connection pad 42 is at the opposite end of the heater tube. In some cases it may be desirable to form more than one heating element on the surface of the heat. A relatively low temperature ozone-water solution, ozone-solvent solution, or other liquid flows into inlet 44 of the quartz heater tube at a given flow rate and then exits from the outlet 46 at the higher temperature. The flow direction for the fluid entering and leaving the heater is shown by the flow arrrows 48 and 50. A temperature sensor and controller (not shown) detects the outlet liquid temperature and controls the application of power to the leads of the heater. The controller compares the actual temperature to the setpoint and controls power to the heater to bring the temperature of the flowing liquid at the outlet to the setpoint temperature. The flow direction for the fluid entering and leaving the heater is shown by the flow arrows 60 and 62. The liquid is conveyed to and from the heater with suitable sections of process compatible tubing or conduit (not shown). The inlet and outlet of the heater are connected to the tubing with suitable flare type, compression, or other fittings. The length and inside diameter of the tubing from the heater outlet to the point of use is chosen to have a small volume since any added volume increases the effective residence volume through which the heated solution must flow from the point of heating to the point of use. This residence volume determines the residence time as discussed earlier. It is often desirable to fabricate multiple heaters using relatively short sections of tubing (12 to 36 inches for example) and then joining those sections together in series or in parallel with Teflon compression tube fittings, or other suitable fittings, to form heaters with higher power capacity. A series connection of three sections is shown in FIG. 8 that follows later in this discussion. The heat power supply may be single phase or three phase. In many high power applications, three phase power is convenient. If each heater has only one heating element, then a heater system assembled comprising three heated tubing sections or multiples of three sections can be conveniently connected to a three phase power source and present a balanced load.

With reference to FIG. 1b, a first method of forming the heating element is to utilize a foil electric heating circuit that is placed directly in thermal contact with the surface of the tubular or other shaped conduit that carries the process fluid to be heated. The foil circuit may be formed by etching, die punching, cutting, or similarly known processes. Such foil electric circuits are known in the heater industry.

With reference to FIG. 1b, a second method of forming the heating element is to use a thick film deposition material such as electrically conductive or resistive inks or pastes or epoxies which may be screen printed, dispensed, or painted directly onto the surface of the tube other shaped conduit that carries the process fluid to be heated. (A convenient method of applying the spiral pattern is to dispense the ink or paste from a nozzle which is moved in the longitudinal direction as the tube is slowly rotated about its longitudinal axis.) Such thick film pastes or inks are supplied by a number of companies including Electro-Science Laboratories. In the case of relatively small diameter tubes (for example 0.250 to 0.375 inch), a spiral pattern may easier to apply than a longitudinal pattern such as that shown in FIG. 1a.

With reference to FIG. 1b, a third method of forming the heating element is to from a thin film heating element by a thin film deposition process such as sputtering, chemical vapor deposition, vacuum evaporation, or other thin film deposition process.

A first alternative inventive design to that shown in FIG. 1a or 1b is a single tube-in-tube resistance heated design employing a tube within a tube with resistive heating elements in thermal contact with the outer surface of the outer tube. The fluid to be heated (process fluid) flows through the volume between the outer tube and the inner tube. (Figure not shown.)

A second alternative design to that shown in FIGS. 1a or 1b is a single tube-in-tube resistance heated design employing a tube within tube with resistive heating elements in thermal contact with the outer surface of the outer tube and resistive heating elements in thermal contact with the inner surface of the inner tube. The fluid to be heated (process fluid) flows through the volume between the outer tube and the inner tube. (Figure not shown.)

A third alternative design to that shown in FIGS. 1a or 1b is a multiple tube-in-tube resistance heated design employing an outer tube and a multiplicity of inner tubes with resistive heating elements in thermal contact with the inner surfaces of the inner tubes The fluid to be heated (process fluid) flows through the volume between the outer tube and the multiplicity of inner tubes. (Figure not shown.)

FIG. 2—Single Tube Solution-Heater with Induction Heated Elements on Outside of Tube.

Description and Operation—FIG. 2

With reference to FIG. 2, an inductively heated element 52 is formed on the exterior surface of a quartz tube 54. The heating element may be deposited in a uniform pattern over the exterior surface of the tube as shown in FIG. 2. A relatively low temperature ozone-water solution, ozone-solvent solution, or other liquid flows into inlet 56 of the quartz heater tube at a given flow rate and then exits from the outlet 58 at the higher temperature. The flow direction for the fluid entering and leaving the heater is shown by the flow arrows 60 and 62. A temperature sensor and controller (not shown) detects the outlet liquid temperature and controls the application of power to the solenoid shaped induction coil which surrounds the heater (not shown). The controller compares the actual temperature to the setpoint and controls power to the induction heating coil which controls the magnitude of the currents (eddy currents) induced in the heating element to bring the temperature of the flowing liquid at the outlet to the setpoint temperature. The liquid is conveyed to and from the heater with suitable sections of process compatible tubing or conduit (not shown). The inlet and outlet of the heater are connected to the tubing with suitable flare type, compression, or other fittings. The length and inside diameter of the tubing from the heater outlet to the point of use is chosen to have a small volume since any added volume increases the effective residence volume through which the heated solution must flow from the point of heating to the point of use. This residence volume determines the residence time as discussed earlier. It is often desirable to fabricate multiple heaters using relatively short sections of tubing (12 to 36 inches for example) and then joining those sections together in series or in parallel with Teflon compression tube fittings, or other suitable fittings, to form heaters with higher power capacity. A series connection of three sections is shown in FIG. 8 that follows later in this discussion. The heat power supply may be single phase or three phase. In many high power applications, three phase power is convenient. If each heater has only one heating element, then a heater system assembled comprising three heated tubing sections or multiples of three sections can be conveniently connected to a three phase power source and present a balanced load.

With reference to FIG. 2, a first method of forming the induction heating element is to utilize a foil electric heating element that is placed directly in thermal contact with the surface of the tubular or other shaped conduit that carries the process fluid to be heated. The foil element may be formed by etching, die punching, cutting, or similarly known processes.

With reference to FIG. 2, a second method of forming the induction heating element is to use a thick film deposition material such as electrically conductive or resistive inks or pastes or epoxies which may be screen printed, dispensed, or painted directly onto the surface of the tube other shaped conduit that carries the process fluid to be heated. Such thick film pastes or inks are supplied by a number of companies including Electro-Science Laboratories.

With reference to FIG. 2, a third method of forming the induction heating element is to from a thin film heating element by a thin film deposition process such as sputtering, chemical vapor deposition, vacuum evaporation, or other thin film deposition process.

A first alternative inventive design to that shown in FIG. 2 is a single tube-in-tube induction heated design employing a tube with inductively heated elements in thermal contact with the outer surface of the outer tube. The fluid to be heated (process fluid) flows through the volume between the outer tube and the inner tube. (Figure not shown.)

A second alternative inventive design to that shown in FIG. 2 is a single tube-in-tube induction heated design employing an outer tube and inner tube with inductively heated elements in thermal contact with the outer surface of the outer tube and inductively heated elements in thermal contact with the inner surface of the inner tube. The fluid to be heated (process fluid) flows through the volume between the outer tube and the inner tube. (Figure not shown.)

A third alternative inventive design to that shown in FIG. 2 is a multiple tube-in-tube induction heated design employing an outer tube and a multiplicity of inner tubes with inductively heated elements in thermal contact with the inner surfaces of the inner tubes The fluid to be heated (process fluid) flows through the volume between the outer tube and the multiplicity of inner tubes. (Figure not shown.)

Since the induction heating element can be a film deposited in an un-broken film on the outer surface of the quartz tube, the heat is transferred uniformly to the outer surface 2nd GROUP: Heat Exchanger Designs (FIG. 3 & FIG. 4)

The tube(s) which carries the process fluid, may be made from any material which is compatible with the process fluid over the range of operating temperatures and pressures and does not introduce undesirable contaminants into the process fluid. Suitable materials in high purity applications include, but are not limited to, quartz and Teflon. The tube(s) which carries the working fluid, may be made from any material which is compatible with the working fluid over the range of operating temperatures and pressures. Suitable materials include, but are not limited to, stainless steel, titanium, copper, aluminum, Quartz, and Teflon. Many applications in semiconductor processing may employ quartz or Teflon and in some cases titanium or titanium alloys, aluminum or aluminum alloys, and other selected non-ferrous metals and non-ferrous metal alloys.

FIG. 3—A Single Tube-in-Tube Heat Exchanger with Process Fluid Flowing Through the Inner Tube.

Description and Operation—FIG. 3

With reference to FIG. 3, a typical tube-in-tube heat exchanger geometry is shown. A relatively low temperature ozone-water solution, ozone-solvent solution, or other liquid flows into inlet 64 of the inner at a given flow rate and then exits from the outlet 66. The flow direction for the fluid entering and leaving the heater is shown by the flow arrows 68 and 70. The inner tube 72 is surrounded by a larger diameter outer tube 74. The outer tube has an inlet port 76 at one end and outlet port 78 at the other end. A heated working fluid, typically supplied by a heating recirculator, enters inlet port 76 and exits from outlet port 78. The hot working fluid flows along longitudinal axis of the heater in the annular volume between the inner tube 72 and the outer tube 74. The flow direction of the hot working fluid is counter to the flow direction of the process fluid being heated. The flow direction for the hot working fluid entering and leaving the heat exchanger is shown by the flow arrows 80 and 82. The outer tube of the heat exchanger has end covers 84 and 86, through which the inner tube 74 passes. This arrangement can be achieved by welding in case of metal exchanger materials, by heat fusing in the case of quartz heat exchanger materials, and or by the use of suitable fittings to form separate connections to the inlet and outlets for each side of the exchanger in the case of Teflon heat exchanger designs. The hot working fluid, hot water in many applications, heats the exterior surface of the inner tube 72. The power transferred through the wall of the inner tube to heat the process fluid that enters inlet 64 is determined by the average temperature differential and the thermal resistance between the hot working fluid and the process fluid as discussed in the analysis section on direct conduction heated designs. However, in the case of heat exchangers, the working fluid temperature is typically lower than the heating element temperature in a direct conduction heated design heater. In the case of water as a working fluid, the maximum temperature is 85 to 90 degree C. In contast, heating element temperatures may be 150 to 200 degree C. or higher. Accordingly, a lower thermal resistance is required to transfer the same power in a heat exchanger since the temperature difference is lower. A first alternative design (not shown) is a single tube-in-tube heat exchanger with the fluid to be heated (process fluid) flowing in the volume between the outer tube and the inner tube and a heated fluid (working fluid) flowing through the inner tube.

FIG. 4—A multiple Tube-in-tube Heat Exchanger with Process Fluid Flowing Through the Inner Tubes.

Description and Operation—FIG. 4

If a heat exchanger is fabricated from metal, then a single tube in tube design can provide an sufficiently low thermal resistance to achieve good power transfer for these modest temperature differences. However, if the heat exchanger is fabricated from Teflon, then a new inventive design, the multiple tube in tube design, is preferred. This inventive design is actually a hybrid of the shell in tube design and a single tube in tube design. The use of multiple tubes in lieu of a single tube increases the surface area for heat transfer and thereby decreases the thermal resistance such that materials other than metal, such as Teflon or quartz may be employed despite their lower thermal conductivity as discussed in the earlier design analysis.

With reference to FIG. 4, the inventive multiple tube-in-tube heat exchanger geometry is shown. A multiplicity of inner tubes 88 is surrounded by a larger diameter outer tube 90. In the design example shown there are seven inner tubes arranged in a hexagonal array. The outer tube of the heat exchanger has an outlet end fitting 92 and similarly designed inlet end fitting (not shown). The outlet end fitting has seven tubing connectors 94 which are connected through an intervening manifold volume 96 to a single outlet tube 98. The seven tubing connections connect to the outlet ends of the seven small diameter inner tubes. The inlet end fitting is of the same design and connects the a single inlet tube (not shown) to the inlets of the seven small diameter inner tubes. The tubing connections may be welded or fused joints or hose fittings.

A relatively low temperature ozone-water solution, ozone-solvent solution, or other liquid flows into inlet tube of the inlet end fitting (not shown) to feed the inlets of the seven small diameter tubes 88. The flow passes through the inner tubes to the outlet end fitting 92 to the outlet fitting 98. The flow direction for the fluid entering and leaving the heater is shown by the flow arrows 100 and 102.

A heated working fluid, typically supplied by a heating recirculator, enters inlet port 104 and exits from outlet port 106. The hot working fluid flows along longitudinal axis of the heater in the interstitial volume between the seven inner tubes 88 and the outer tube 90. The flow direction of the hot working fluid is counter to the flow direction of the process fluid being heated. The flow direction for the hot working fluid entering and leaving the heat exchanger is shown by the flow arrows 108 and 110.

The outer tube of the heat exchanger has an outlet end fitting 95 and an inlet end fitting of the same design (not shown). These fittings can be fabricated by welding in case of metal exchanger materials, by heat fusing in the case of quartz heat exchanger materials, and or by the use of suitable fittings and a fabricated transition piece to between the seven the small end fittings and the single inlet or outlet fitting.

In practice for the flow rates and power levels listed in the analysis of the direct conduction heated designs, a tube in tube exchanger may have an outer diameter of the order of 0.5 inch and a length of the order of 10 to 20 feet. The analysis of the multiple tube-in-tube heat exchanger with Teflon wetted materials was presented in any earlier discussion. FIG. 4, like all the other figures, is not to scale; the heater is much longer relative to its diameter than depicted.

A first alternative design (not shown) is a multiple tube-in-tube heat exchanger with fluid to be heated (process fluid) flowing in the annular volume between the outer tube and the multiplicity of inner tubes and the heated fluid (working fluid) flowing through the inner tubes.

3$^{rd}$ GROUP: Direct Microwave Heater Designs (FIG. 5)

FIG. 5—Single Tube Solution-heater with a Microwave Radiation Source to Heat the Liquid Flowing in the Tube.

Description and Operation—FIG. 5

With reference to FIG. 5, the inventive direct microwave heater design is shown. A length of quartz tubing 112 is contained inside a microwave resonator 114. Microwave resonator 114 is connected to microwave power source 116 by a length of wave-guide 119. A relatively low temperature ozone-water solution, ozone-solvent solution, or other liquid flows into inlet 118 of the quartz tube 112 at a given flow rate and then exits from the outlet 120 at the higher temperature. The flow direction for the fluid entering and leaving the microwave heater is shown by the flow arrows 122 and 124.

A temperature sensor and controller (not shown) detects the outlet liquid temperature and controls the application of microwave power to the flowing liquid. The controller compares the actual temperature to the setpoint and controls power to bring the temperature of the flowing liquid at the outlet to the setpoint temperature.

4th GROUP: Direct Infrared Heater Designs (FIG. 6)

FIG. 6—Single Tube Solution-heater with a Infrared Radiation Source to Heat the Liquid Flowing in the Tube.

Description and Operation—FIG. 6

With reference to FIG. 6, the inventive direct infrared heater design is shown. A relatively low temperature ozone-water solution, ozone-solvent solution, or other liquid flows into inlet 126 of the quartz tube 128 at a given flow rate and then exits from the outlet 130 at the higher temperature. The flow direction for the fluid entering and leaving the infrared heater is shown by the flow arrows 132 and 134. Two infrared radiation sources 136 and 138 are positioned adjacent to the quartz tube. Two shaped reflectors 140 and 142 reflect the infrared radiation toward the quartz tube. The inner surfaces 144 and 146 of the reflectors are coated with suitable infrared reflecting layers.

A temperature sensor and controller (not shown) detects the outlet liquid temperature and controls the application of infrared power to the flowing liquid. The controller compares the actual temperature to the setpoint and controls power to bring the temperature of the flowing liquid at the outlet to the setpoint temperature.

5th GROUP: Heated Fluid Injection Designs (FIG. 7)

FIG. 7—A Fluid Injection Type Heater with a Heated Fluid (Heated Water or Steam for Example) Injected into the Inlet Port of an Injector and the Fluid to be Heated (Cold Process Fluid) Flowing into the Motive Flow Inlet of the Injector and the Heated Process Fluid Flowing from the Outlet Port of the Injector.

Description and Operation—FIG. 7

With reference to FIG. 7, the inventive fluid injection heater design is shown in a block diagram. A relatively low temperature ozone-water solution, ozone-solvent solution, or other liquid (the process fluid) flows into inlet motive flow inlet port of an eductor, ejector, or venturi injector 150 and exits from the outlet port 152 at the higher temperature. A source of water 154 feeds the inlet 156 of steam generator 158. The outlet of the steam generator 158 is connected by a conduit to the suction inlet (mixing) port of the eductor, ejector, or venturi injector 150. The steam injected mixes with the process fluid inside the injector and condenses. When the steam condenses, its gives up energy (its heat of condensation) to the process fluid and increases the temperature of the process fluid. Given that an injector can have a very small internal volume of less than 20 ml, the residence time is very small and the process fluid (an ozone solvent solution for example) can be heated very rapidly.

The tube and injector element which carries both the process fluid and the injected heated fluid (high purity steam for example), may be made from any material which is compatible with the process fluid and injected heated fluid over the range of operating temperatures and pressures and does not introduce undesirable contaminants into the process fluid. Suitable materials in high purity applications include, but are not limited to, quartz and Teflon.

A first alternative inventive design may employ a static mixer in lieu of a venturi injector, eductor, or ejector. Static mixers are readily available in quartz.

6th GROUP: Long Heater Design Geometry FIG. 8 and FIG. 9)

FIG. 8—A General Approach to Joining Individual Straight Sections of Heater with Fittings into a Folded Compact Heater Design.

Description and Operation—FIG. 8

It is often desirable to fabricate multiple heaters using relatively short sections of tubing (12 to 36 inches for example) and then joining those sections together in series or in parallel with Teflon compression tube fittings, or other suitable fittings, to form heaters with higher power capacity. A series connection of three sections is shown in FIG. 8 that follows later in this discussion. The heat power supply may be single phase or three phase. In many high power applications, three phase power is convenient. If each heater has only one heating element, then a heater system assembled comprising three heated tubing sections or multiples of three sections can be conveniently connected to a three phase power source and present a balanced load.

In reference to FIG. 9, three short heater sections 162, 164, and 166 are joined in series by U-bends 168 and 170 and tubing connectors 172, 174, 176, and 178. The connectors may be Teflon compression tube fittings. The process fluid then enters the inlet 180 of the first section 162, and flows through the connected sections 164 and 166 to the outlet 182. In practice any number of heaters can be interconnected in this manner. If each heater section is sized for 1 kW power transfer, then nine heaters can be interconnected in this way to form a compact 3×3 array of parallel heater tubes for a total heating capacity of 9 kW. Such an array can be conveniently connected to a three phase power source as discussed above.

FIG. 9—A General Approach to Bending a Long Heater into a Coil for a Compact Heater Design.

Description and Operation—FIG. 9

An alternative approach to fabricating long direct heated heaters or heat exchangers is to bend a long heater into a coil as shown schematically in FIG. 9. This is particularly attractive for the multiple tube in tube heater based upon inner tubes of Teflon which and an outer tube of Teflon or Stainless Steel. A 10 to 20 foot long multiple tube in tube heat exchanger can be very compact in a coiled configuration.

Other Considerations

Those skilled in the art will appreciate that the present invention, and the inventions described in the referenced prior application Ser. No. 09/693,012, can be extended to other gas-solvent solutions. In particular the invention can be extended to hydrogen-water solutions and other hydrogen-solvent solutions. One can, for example, form a hydrogen-water solution at a relatively low temperature T1 to form a relatively high dissolved hydrogen concentration, and then quickly heat the hydrogen-solvent solution to a relatively high temperature T2 to form a hydrogen water solution with a much higher surface reaction rate at temperature T2 than an hydrogen-water solution at T1, and with a much higher dissolved hydrogen concentration at temperature T2 than could be achieved if the hydrogen-water solution had originally been formed at T2. Hydrogen-water solutions and other hydrogen solvent solutions are important in the processing of materials and electronic devices because they are reducing agents. One application may be the rapid re-hydrogenation of ion-implanted photoresist to facilitate removal. Those skilled in the art will appreciate that although the present invention can be extended to Hydrogen-solvent solutions, there are some significant differences due to the fact that the Hydrogen does not tend to decompose as does ozone when subjected to a rising temperature.

What is claimed is:

1. A method of quickly heating an ozone-solvent solution from a relatively low temperature T1 to a relatively high temperature T2, such that said ozone-solvent solution has a much higher dissolved ozone concentration at temperature T2 than could be achieved if the ozone-solvent solution had originally been formed at said temperature T2, comprising:
   a) introducing said ozone-solvent solution at a temperature T1 into a heating volume, said heating volume also having an outlet orifice;
   b) transferring sufficient power into said heating volume while said ozone-solvent solution is flowing through said heating volume to create a heated flowing ozone-solvent solution having a temperature T2 at the outlet orifice of the heating volume, wherein the power transferred has a power density greater than 20 w/cm$^3$;
   c) receiving said heated flowing ozone-solvent solution at said temperature T2 from the outlet orifice of said heating volume.

2. The method of claim 1 wherein the power transferred has a power density greater than 50 w/cm3.

3. The method of claim 1 wherein the power transferred has a power density greater than 100 w/cm3.

4. The method of claim 1, 2, or 3 wherein the heating volume is contained by a non-metallic material.

5. The method of claim 4 wherein the non-metallic material is selected from the group consisting of Teflon PFA, Teflon TFE, Teflon PTFE, PVDF, quartz, glass, plastic, ceramic, Aluminum Oxide, and Aluminum Nitride.

6. The method of claim 5 wherein said heating volume is contained by an internal surface area and wherein the ratio of that internal surface area to the heating volume is at least 2.5 cm−1.

7. The method of claim 4 wherein said heating volume is contained by an internal surface area and wherein the ratio of that internal surface area to the heating volume is at least 2.5 cm−1.

8. The method of claim 1, 2, or 3 wherein the heating volume is contained by a non-ferrous metal or a non-ferrous metal.

9. The method of claim 8 wherein said heating volume is contained by an internal surface area and wherein the ratio of that internal surface area to the heating volume is at least 2.5 cm−1.

10. The method of claim 1, 2, or 3 wherein the heating volume is contained by a non-ferrous metal or non-ferrous metal alloy selected from the group consisting of aluminum, aluminum alloys, titanium, and titanium alloys.

11. The method of claim 10 wherein said heating volume is contained by an internal surface area and wherein the ratio of that internal surface area to the heating volume is at least 2.5 cm−1.

12. The method of claim 10 wherein said heating volume is contained by an internal surface area and wherein said power is transferred into said heating volume by resistance heated elements in thermal contact with said surface area.

13. The method of claim 1 wherein said heating volume is contained by an internal surface area and wherein said power is transferred into said heating by induction heated elements in thermal contact with said surface area.

14. The method of claim 1 wherein said heating volume is contained by an internal surface area and wherein said power is transferred into said heating volume by a heated fluid in thermal contact with said surface area.

15. The method of claim 1 wherein said power is transferred from a microwave power source to the flowing ozone solvent solution.

16. The method of claim 1 the power is transferred from an infrared power source to the flowing ozone solvent solution.

17. The method of claim 1 wherein the power is transferred by mixing a heated fluid with the flowing ozone solvent solution.

18. The method of claim 17 wherein the heated fluid comprises steam.

19. The method of claim 1 wherein said heating volume is contained by an internal surface area and wherein the ratio of that internal surface area to the heating volume is at least 2.0 cm−1.

20. The method of claim 1 wherein said heating volume is contained by an internal surface area and wherein the ratio of that internal surface area to the heating volume is at least 5.0 cm−1.

21. A device for quickly heating a flowing ozone-solvent solution from a relatively low temperature T1 to a relatively high temperature T2 to form an ozone-solvent solution with a much high dissolved ozone concentration at temperature T2 than could be achieved if the ozone-solvent solution had originally been formed at T2 comprising:
   a) A solution heating volume with an inlet for receiving a flowing ozone-solvent solution at a temperature T1 and an outlet for delivering said ozone-solvent solution;
   b) power means for transferring power to said ozone solvent solution as said ozone-solvent solution flows from said inlet, through said solution heating volume, to said outlet wherein said power means provides a power density greater than 20 w/cm$^3$ to said flowing ozone-solvent solution.

22. A device as in claim 21 wherein said power means provides a power density greater than 50 w/cm3 to said flowing ozone-solvent solution.

23. A device as in claim 21 wherein said power means provides a power density greater than 100 w/cm$^3$ to said flowing ozone-solvent solution.

24. A device as in claim 21 wherein said solution heating volume is contained by an internal surface, and wherein said power means comprises resistance heated elements in thermal contact with said internal surface.

25. A device as in claim 21 wherein said solution heating volume is contained by an internal surface, and wherein said power means comprises induction heated elements in thermal contact with said internal surface.

26. A device as in claim 21 wherein said solution heating volume is contained by an internal surface, and wherein said power means comprises a heated fluid in thermal contact with said internal surface.

27. A device as in claim 21 wherein said power means comprises a microwave power source coupled to a resonant cavity at least partially enclosing the solution heating volume.

28. A device as in claim 21 wherein said power means comprises an infrared power source which illuminates the flowing ozone solvent solution as it passes through the solution heating volume.

29. A device as in claim 21 wherein said power means comprises a source of heated fluid coupled to an injector directed so as to mix said heated fluid with the flowing ozone solvent solution.

30. A device as in claim 29 wherein said heated fluid comprises steam.

31. A device as in claim 21 wherein said solution heating volume is contained by an internal surface, and wherein the ratio of the area of the internal surface to the volume of said solution heating volume is at least 2.0 cm−1.

32. A device as in claim 21 wherein said solution heating volume is contained by an internal surface, and wherein the ratio of the area of the internal surface to the volume of said solution heating volume is at least 5.0 cm−1.

\* \* \* \* \*